(12) United States Patent
Larsson et al.

(10) Patent No.: US 12,515,393 B2
(45) Date of Patent: Jan. 6, 2026

(54) METHOD FOR FORMING CELLULOSE PRODUCTS IN A FORMING MOULD SYSTEM FROM A CELLULOSE BLANK STRUCTURE, A FORMING MOULD SYSTEM, AND A CELLULOSE BLANK STRUCTURE

(71) Applicant: PulPac AB, Västra Frölunda (SE)

(72) Inventors: Ove Larsson, Västra Frölunda (SE); Edward Guidotti, Gothenburg (SE); Olle Högblom, Gothenburg (SE)

(73) Assignee: PulPac AB, Västra Frölunda (SE)

( * ) Notice: Subject to any disclaimer, the term of this patent is extended or adjusted under 35 U.S.C. 154(b) by 232 days.

(21) Appl. No.: 18/272,464

(22) PCT Filed: Jan. 5, 2022

(86) PCT No.: PCT/EP2022/050164
§ 371 (c)(1),
(2) Date: Jul. 14, 2023

(87) PCT Pub. No.: WO2022/152609
PCT Pub. Date: Jul. 21, 2022

(65) Prior Publication Data
US 2024/0075676 A1    Mar. 7, 2024

(30) Foreign Application Priority Data
Jan. 18, 2021    (EP) .................................... 21152151

(51) Int. Cl.
*B29C 51/22*    (2006.01)
*B29C 51/00*    (2006.01)
(Continued)

(52) U.S. Cl.
CPC .......... *B29C 51/082* (2013.01); *B29C 51/002* (2013.01); *B29C 51/22* (2013.01); *B29K 2001/00* (2013.01)

(58) Field of Classification Search
CPC ..... B29C 51/002; B29C 51/082; B29C 51/22; B30B 11/16; B30B 15/308; D21J 5/00
See application file for complete search history.

(56) References Cited

U.S. PATENT DOCUMENTS

2019/0070819 A1*    3/2019    Larsson .............. B29C 49/0005

FOREIGN PATENT DOCUMENTS

WO    WO-2019209160 A1    10/2019
WO    WO-2020229608 A1    11/2020

OTHER PUBLICATIONS

International Search Report and Written Opinion for Application No. PCT/EP2022/050164, dated Apr. 20, 2022.
(Continued)

*Primary Examiner* — Yunju Kim
(74) *Attorney, Agent, or Firm* — Sage Patent Group

(57) ABSTRACT

A method for forming cellulose products in a mould system from an air-formed cellulose blank structure, where the forming mould system comprises a first mould part and a second mould part. The method comprises the steps: providing the cellulose blank structure, and defining one or more product sections and a residual section; compressing at least a portion of the residual section to a first degree of compression higher than a degree of compression of the one or more product sections; feeding the cellulose blank structure in a feeding direction to a forming position in the forming mould system, where in the forming position each product section is arranged between a corresponding first mould part and second mould part; forming the cellulose products from the cellulose blank structure between the first
(Continued)

mould part and the second mould part by heating the cellulose blank structure and pressing the cellulose blank structure.

20 Claims, 19 Drawing Sheets

(51) Int. Cl.
  *B29C 51/08* (2006.01)
  *B29K 1/00* (2006.01)

(56) References Cited

OTHER PUBLICATIONS

Extended European Search Report in corresponding application No. EP 21152151.3, dated Jun. 28, 2021.
Extended European Search Report in corresponding application No. EP 22212348.1, dated Mar. 14, 2023.
Extended European Search Report in corresponding application No. EP 23158166.1, dated Jun. 5, 2023.

* cited by examiner

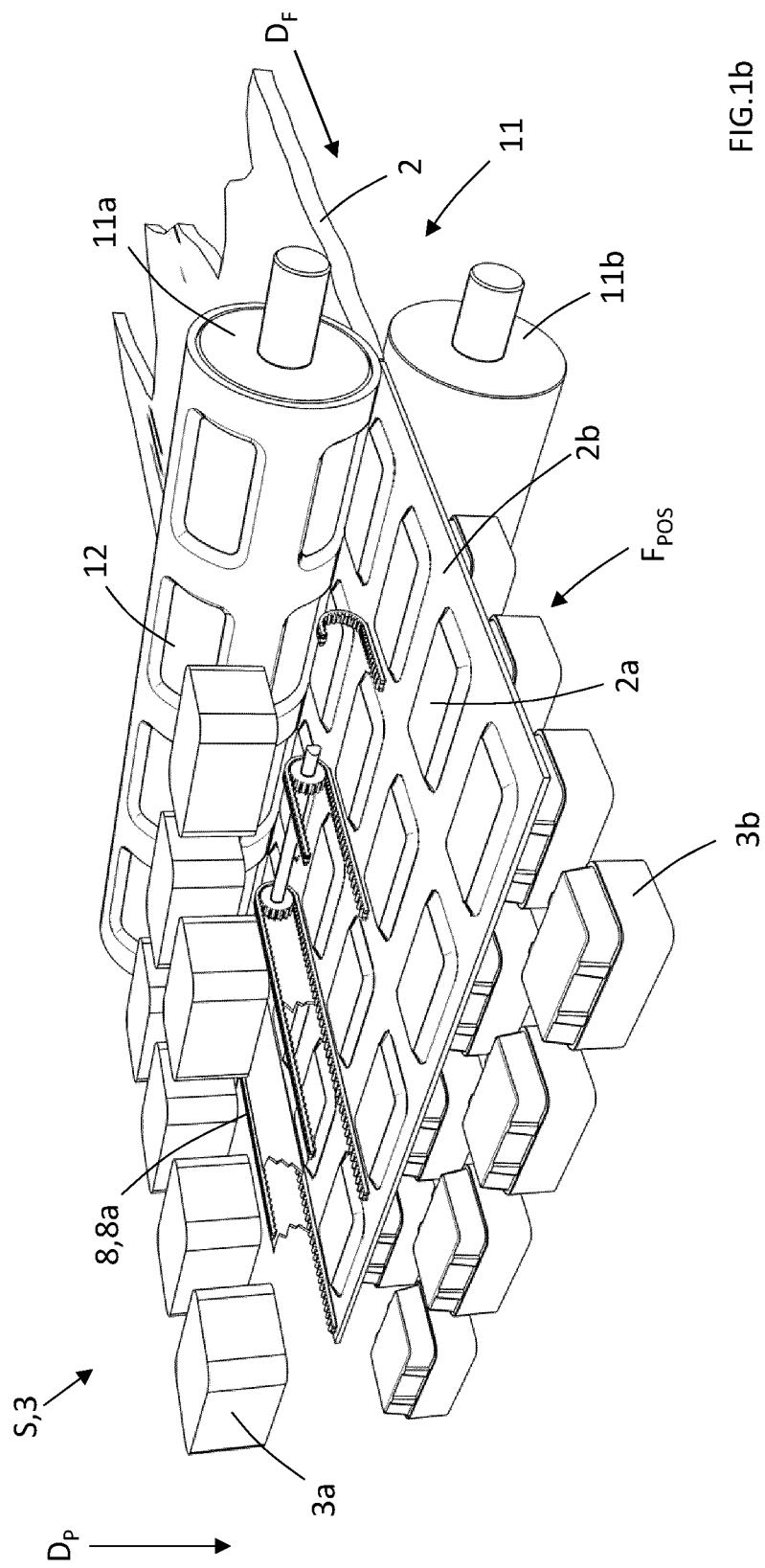

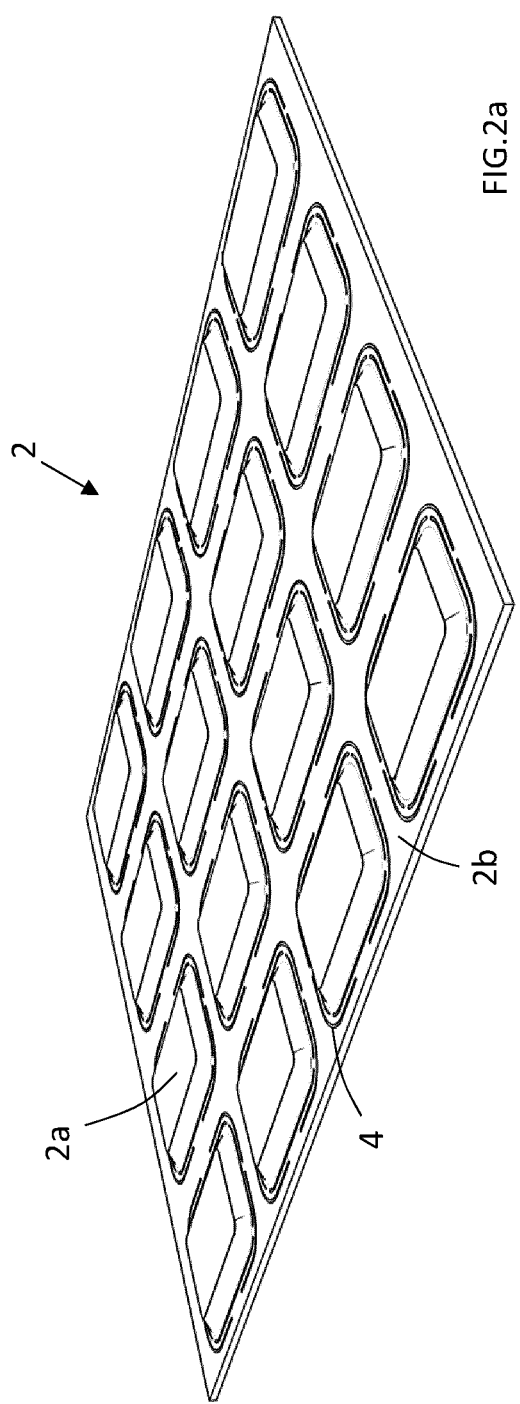

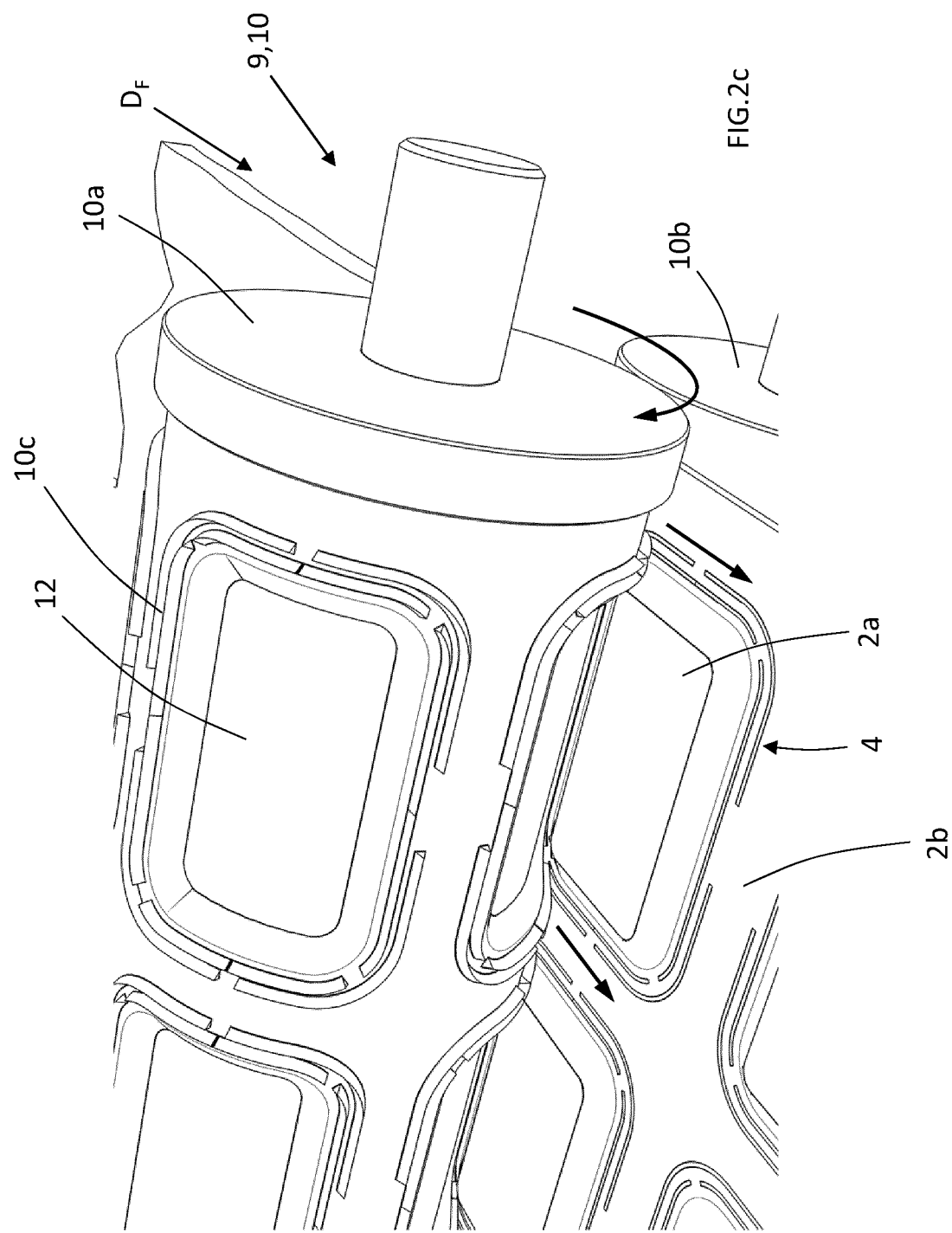

METHOD FOR FORMING CELLULOSE PRODUCTS IN A FORMING MOULD SYSTEM FROM A CELLULOSE BLANK STRUCTURE, A FORMING MOULD SYSTEM, AND A CELLULOSE BLANK STRUCTURE

TECHNICAL FIELD

The present disclosure relates to a method for forming cellulose products in a forming mould system from an air-formed cellulose blank structure. The forming mould system comprises one or more forming moulds, wherein each forming mould comprises a first mould part and a second mould part configured for cooperating with each other during the forming of the cellulose products. The disclosure further relates to a forming mould system and a cellulose blank structure.

BACKGROUND

Cellulose fibres are often used as raw material for producing or manufacturing products. Products formed of cellulose fibres can be used in many different situations where there is a need for having sustainable products. A wide range of products can be produced from cellulose fibres and a few examples are disposable plates and cups, cutlery, lids, bottle caps, coffee pods, and packaging materials.

Forming moulds are commonly used when manufacturing cellulose products from raw materials including cellulose fibres, and traditionally the cellulose products have been produced with wet-forming techniques. A material commonly used for wet-forming cellulose fibre products is wet moulded pulp. Wet moulded pulp has the advantage of being considered as a sustainable packaging material, since it is produced from biomaterials and can be recycled after use. Consequently, wet moulded pulp has been quickly increasing in popularity for different applications. Wet moulded pulp articles are generally formed by immersing a suction forming mould into a liquid or semi liquid pulp suspension or slurry comprising cellulose fibres, and when suction is applied, a body of pulp is formed with the shape of the desired product by fibre deposition onto the forming mould. With all wet-forming techniques, there is a need for drying of the wet moulded product, where the drying is a very time and energy consuming part of the production. The demands on aesthetical, chemical and mechanical properties of cellulose products are increasing, and due to the properties of wet-formed cellulose products, the mechanical strength, flexibility, freedom in material thickness, and chemical properties are limited. It is also difficult in wet-forming processes to control the mechanical properties of the products with high precision.

One development in the field of producing cellulose products is the forming of cellulose fibres without using wet-forming techniques. Instead of forming the cellulose products from a liquid or semi liquid pulp suspension or slurry, an air-formed cellulose blank structure is used. The air-formed cellulose blank structure is inserted into a forming mould and during the forming of the cellulose products the cellulose blank is subjected to a high forming pressure and a high forming temperature. When inserting the cellulose blank structure into the forming mould, there is a risk that the cellulose blank structure breaks apart in an undesired manner, which leads to an improper forming of the cellulose products. This is a common issue with traditional cellulose high pressure forming methods, especially for deep-drawn products, leading to products with low quality. Other problems with traditional forming methods using standard cellulose blank structures, especially when forming deep-drawn products, are that that cracks, fibre separations, material fractures, or other unwanted structural weakenings of the cellulose blank structure are occurring during the insertion of the cellulose blank structure into the forming mould and during the forming process in the forming mould.

There is thus a need for an improved method, forming mould system, and cellulose blank structure, for forming cellulose products from an air-formed cellulose blank structure.

SUMMARY

An object of the present disclosure is to provide a method for forming cellulose products in a forming mould system from a cellulose blank structure, a forming mould system, and a cellulose blank structure, where the previously mentioned problems are avoided. This object is at least partly achieved by the features of the independent claims. The dependent claims contain further developments of the method for forming cellulose products in a forming mould system from a cellulose blank structure.

The disclosure concerns a method for forming cellulose products in a forming mould system from an air-formed cellulose blank structure. The forming mould system comprises one or more forming moulds, wherein each forming mould comprises a first mould part and a second mould part configured for cooperating with each other during the forming of the cellulose products. The method comprises the steps: providing the cellulose blank structure, and in the cellulose blank structure defining one or more product sections and a residual section surrounding or arranged in connection to the one or more product sections; compressing at least a portion of the residual section to a first degree of compression higher than a degree of compression of the one or more product sections; feeding the cellulose blank structure in a feeding direction to a forming position in the forming mould system, where in the forming position each product section is arranged between a corresponding first mould part and second mould part; forming the cellulose products from the cellulose blank structure between the first mould part and the second mould part by heating the cellulose blank structure to a forming temperature in the range of 100-300° C.; and pressing the cellulose blank structure with a forming pressure in the range of 1-100 MPa, preferably 4-20 MPa.

Advantages with these features are that when transporting and inserting the cellulose blank structure into the forming mould, the risk for the cellulose blank structure to break apart in an undesired manner is prevented. The solution leads to better forming of the cellulose products with improved product quality, especially for deep-drawn products. Cracks, fibre separations, material fractures, or other unwanted structural weakenings of the cellulose blank structure is with the method minimized through the forming of the product sections and residual section, when the cellulose blank structure is inserted into the forming mould and during the forming process in the forming mould. With the residual section compressed to a first degree of compression higher than a degree of compression of the one or more product sections, the transportation of the cellulose blank structure is simplified and the residual sections are through the higher degree of compression allowing transportation of the cellulose blank structure at higher feeding speeds without breaking the structure. The less compressed product sections are allowing a flexible fibre transportation into the forming moulds. Higher feeding speeds are reducing the product forming cycle time.

According to an aspect of the disclosure, the cellulose blank structure further comprises one or more transition sections arranged between the one or more product sections and the residual section. In the one or more transition sections, the degree of compression is varying between the first degree of compression and the degree of compression of the one or more product sections. The transition sections are forming structures that are supporting the fibre transportation into the forming moulds. The transition sections are further preventing fractures of the fibres in the cellulose blank structure between the product sections and the residual section.

According to another aspect of the disclosure, the method further comprises the step: compressing at least a portion of the one or more product sections to a second degree of compression prior to the feeding of the cellulose blank structure to the forming position, wherein the first degree of compression is higher than the second degree of compression. The second degree of compression can be different for different types of products formed, and more deep-drawn products often require a lower degree of compression.

According to an aspect of the disclosure, the method further comprises the step: in the forming position at least partly displacing the residual section and the one or more product sections relative to each other in a pressing direction of the forming mould system prior to the forming of the cellulose products. The displacement is facilitating the forming of the cellulose products, especially for deep-draw products, where the fibres in the cellulose blank structure are allowed to move in relation to each other.

According to another aspect of the disclosure, the method further comprises the step: arranging a cutting pattern in the residual section and/or the transition section at least partly around each product section. Each cutting pattern is forming at least one bridging structure in the residual section and/or the transition section for keeping each product section partly connected with the residual section and/or the transition section. The cutting pattern are supporting the forming of the cellulose products, where the products sections are allowed to more relative to the rest of the cellulose blank structure. The bridging structures are efficiently keeping the product sections in position in relation to the forming moulds during the product forming operation.

According to a further aspect of the disclosure, each cutting pattern comprises a non-continuous first cut arranged around and in connection to a corresponding product section. The non-continuous first cut comprises one or more first cut lines with one or more first intermediate sections between the one or more first cut lines. The one or more first intermediate sections are forming the at least one bridging structure. The cutting pattern with this configuration is simple in design.

According to an aspect of the disclosure, each cutting pattern comprises a first cut arranged around and in connection to a corresponding product section. The first cut comprises a first cut line with a first intermediate section forming the at least one bridging structure.

According to another aspect of the disclosure, each cutting pattern comprises a non-continuous first cut arranged around and in connection to a corresponding product section, and a non-continuous second cut arranged around and outwards of the non-continuous first cut relative to the product section. The first cut and the second cut are efficiently cooperating to form the at least one bridging structure.

According to a further aspect of the disclosure, the non-continuous first cut comprises one or more first cut lines with one or more first intermediate sections between the one or more first cut lines. The non-continuous second cut comprises one or more second cut lines with one or more second intermediate sections between the one or more second cut lines. The one or more first intermediate sections and the one or more second intermediate sections are forming the at least one bridging structure. This type of cutting pattern is efficiently allowing displacement of the product sections in relation to the rest of the cellulose blank structure during the product forming operation, and is suitable for deep-drawn products.

According to an aspect of the disclosure, the non-continuous first cut and the non-continuous second cut are arranged in an overlapping relationship relative to each other. The one or more first cut lines are overlapping the one or more second intermediate sections, and the one or more second cut lines are overlapping the one or more first intermediate sections.

According to another aspect of the disclosure, each cutting pattern further comprises at least one non-continuous additional cut arranged around and outwards of the non-continuous second cut relative to the product section. Each of the at least one non-continuous additional cut comprises one or more additional cut lines with one or more additional intermediate sections between the one or more additional cut lines. This type of cutting pattern is efficiently allowing displacement of the product sections in relation to the rest of the cellulose blank structure during the product forming operation, and is suitable for deep-drawn products.

According to a further aspect of the disclosure, each cut is extending through the cellulose blank structure. In this way, each cut is forming an opening in the cellulose blanks structure for an efficient displacement of the product sections.

According to an aspect of the disclosure, at least one of the intermediate sections comprise a cut extending partly through the cellulose blank structure. The partly extending cut may support the positioning of the product sections relative to the forming moulds during transportation of the cellulose blank structure.

According to another aspect of the disclosure, the method further comprises the step: arranging the one or more cutting patterns in the residual section and/or the transition section around each product section with a cutting unit. The cutting unit is used for forming the cutting patterns and may have different configurations, such as a rotary die cutter or a press cutting device.

According to a further aspect of the disclosure, the cutting unit is arranged as a rotary die cutter. The method further comprises the step: forming the one or more cutting patterns and compressing at least a part of the residual section with the rotary die cutter in a single operational step; or forming the one or more cutting patterns, compressing at least a part of the residual section, and compressing at least a portion of the one or more product sections with the rotary die cutter in a single operational step.

According to an aspect of the disclosure, the method further comprises the step: cutting out the cellulose products from the cellulose blank structure in the forming mould system during forming of the cellulose products. With this method, the cellulose products can be cut out from the cellulose blank structure in direct connection to the forming moulds when the cellulose blank structure is arranged in the forming position.

According to another aspect of the disclosure, the product sections are arranged in the cellulose blank structure in a pattern corresponding to the arrangement of the one or more forming moulds in the forming mould system.

The cellulose blank structure may be transported in the feeding direction with one or more feeder belts. The feeder belts are providing efficient and simple transportation means of the cellulose blank structure.

The disclosure further concerns a forming mould system for forming cellulose products from an air-formed cellulose blank structure. The cellulose blank structure comprises one or more defined product sections and a defined residual section surrounding or arranged in connection to the one or more product sections. The forming mould system comprises one or more forming moulds, where each forming mould comprises a first mould part and a second mould part configured for cooperating with each other during the forming of the cellulose products. The forming mould system further comprises: a compacting unit configured for compressing at least a portion of the residual section to a first degree of compression higher than a degree of compression of the one or more product sections; and a feeding unit configured for feeding the cellulose blank structure in a feeding direction to a forming position in the forming mould system. In the forming position, each product section is arranged between a corresponding first mould part and second mould part. The one or more forming moulds are configured for: forming the cellulose products from the cellulose blank structure between the first mould part and the second mould part by heating the cellulose blank structure to a forming temperature in the range of 100-300° C.; and pressing the cellulose blank structure with a forming pressure in the range of 1-100 MPa, preferably 4-20 MPa. Advantages with these system features are that when inserting the cellulose blank structure into the forming mould, the risk for the cellulose blank structure to break apart in an undesired manner is prevented. The solution leads to better forming of the cellulose products, especially for deep-drawn products.

The disclosure further concerns a cellulose blank structure for forming cellulose products in a forming mould system. The cellulose blank structure is air-formed and comprises one or more defined product sections and a defined residual section surrounding or arranged in connection to the one or more product sections. At least a portion of the residual section has a first degree of compression higher than a degree of compression of the one or more product sections. The cellulose blank structure further comprises: one or more transition sections arranged between the one or more product sections and the residual section. In the transition section the degree of compression is varying between the first degree of compression and the degree of compression of the one or more product sections. The cellulose blank structure further comprises a cutting pattern in the residual section and/or the transition section at least partly around each product section. Each cutting pattern is forming at least one bridging structure in the residual section and/or the transition section. Cracks, fibre separations, material fractures, or other unwanted structural weakenings of the cellulose blank structure is with the system minimized through the forming of the product sections and residual section, when the cellulose blank structure is inserted into the forming mould and during the forming process in the forming mould. With the residual section compressed to a first degree of compression higher than a degree of compression of the one or more product sections, the transportation of the cellulose blank structure is simplified.

BRIEF DESCRIPTION OF DRAWINGS

The disclosure will be described in detail in the following, with reference to the attached drawings, in which FIG. 1a-b show schematically in perspective views, a cellulose blank structure and a forming mould system with a compacting unit, according to the disclosure, FIG. 2a-c show schematically in perspective views, a cellulose blank structure with cutting patterns and a forming mould system with a cutting unit, according to the disclosure.

DESCRIPTION OF EXAMPLE EMBODIMENTS

Figure 1A:
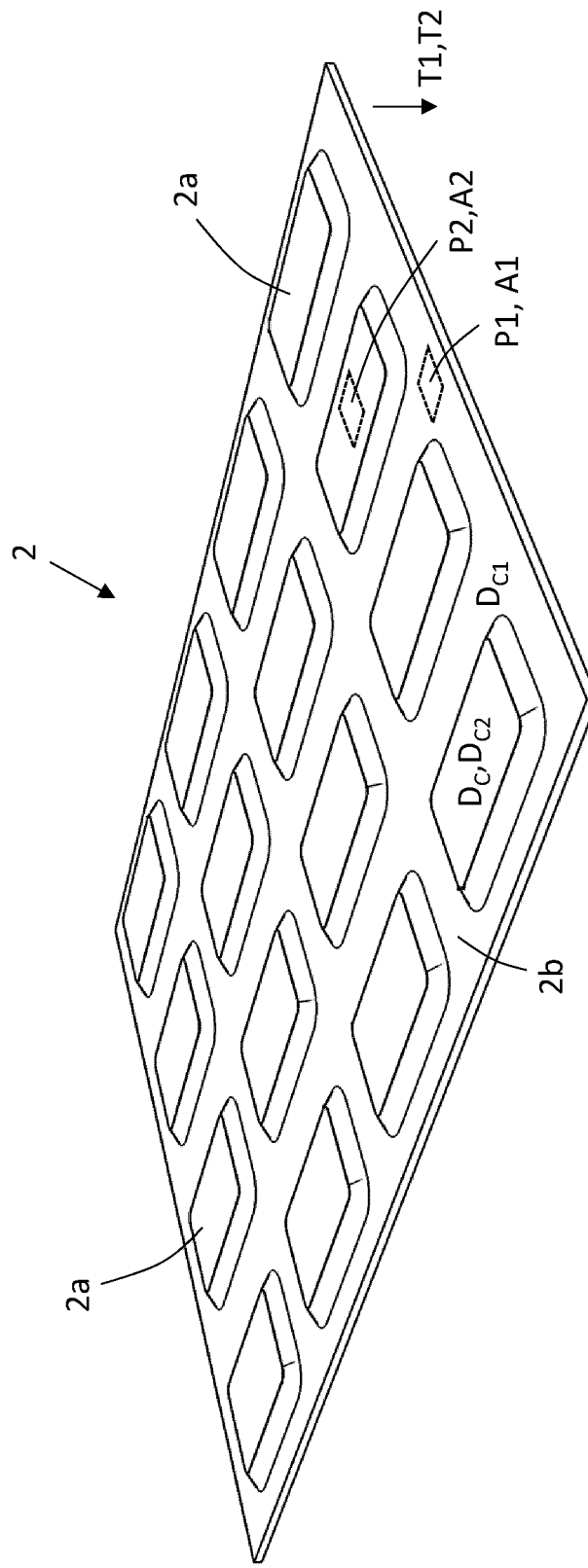

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

FIGS. 1b, 2b, 5a-e, and 9a-b, schematically show a forming mould system S for forming cellulose products 1 from an air-formed cellulose blank structure 2. The forming mould system S comprises one or more forming moulds 3, where each forming mould 3 comprises a first mould part 3a and a second mould part 3b configured for cooperating with each other during the forming of the cellulose products 1. A control unit connected to the forming mould system S is suitably used for controlling different forming steps.

FIGS. 1a, 2a, 3a-b and 4a-b, schematically show the air-formed cellulose blank structure 2. With an air-formed cellulose blank structure 2 according to the disclosure is meant an essentially air-formed fibrous web structure produced from cellulose fibres. With air-forming of the cellulose blank structure 2 is meant the formation of a cellulose blank structure in a dry-forming process in which cellulose fibres are air-formed to produce the cellulose blank structure 2. When forming the cellulose blank structure 2 in the air-forming process, the cellulose fibres are carried and formed to the fibre blank structure 2 by air as carrying medium. This is different from a normal papermaking process or a traditional wet-forming process, where water is used as carrying medium for the cellulose fibres when forming the paper or fibre structure. In the air-forming process, small amounts of water or other substances may if desired be added to the cellulose fibres in order to change the properties of the cellulose product, but air is still used as carrying medium in the forming process. The cellulose blank structure 2 may, if suitable have a dryness that is mainly corresponding to the ambient humidity in the atmosphere surrounding the air-formed cellulose blank structure 2. As an alternative, the dryness of the cellulose blank structure 2 can be controlled in order to have a suitable dryness level when forming the cellulose products 1.

The air-formed cellulose blank structure 2 may be formed of cellulose fibres in a conventional air-forming process and be configured in different ways. For example, the cellulose blank structure 2 may have a composition where the fibres are of the same origin or alternatively contain a mix of two or more types of cellulose fibres, depending on the desired properties of the cellulose products 1. The cellulose fibres used in the cellulose blank structure 2 are during the forming process of the cellulose products 1 strongly bonded to each other with hydrogen bonds. The cellulose fibres may be mixed with other substances or compounds to a certain amount as will be further described below. With cellulose fibres is meant any type of cellulose fibres, such as natural cellulose fibres or manufactured cellulose fibres. The cellulose blank structure 2 may specifically comprise at least 95% cellulose fibres, or more specifically at least 99% cellulose fibres.

The air-formed cellulose blank structure 2 may have a single-layer or a multi-layer configuration. A cellulose blank structure 2 having a single-layer configuration is referring to a structure that is formed of one layer containing cellulose fibres. A cellulose blank structure 2 having a multi-layer configuration is referring to a structure that is formed of two or more layers comprising cellulose fibres, where the layers may have the same or different compositions or configurations.

The cellulose blank structure 2 may comprise a reinforcement layer comprising cellulose fibres, where the reinforcement layer may be arranged as a carrying layer for other layers of the cellulose blank structure 2. The reinforcement layer may have a higher tensile strength than other layers of the cellulose blank structure 2. This is useful when one or more air-formed layers of the cellulose blank structure 2 have compositions with low tensile strength in order to avoid that the cellulose blank structure 2 will break during the forming of the cellulose products 1. The reinforcement layer with a higher tensile strength acts in this way as a supporting structure for other layers of the cellulose blank structure 2. The reinforcement layer may be of a different composition than the rest of the cellulose blank structure, such as for example a tissue layer containing cellulose fibres, an airlaid structure comprising cellulose fibres, or other suitable layer structures. It is thus not necessary that the reinforcement layer is air-formed. The cellulose blank structure 2 may comprise more than one reinforcement layer if suitable.

The one or more air-formed layers of the cellulose blank structure 2 are fluffy and airy structures, where the cellulose fibres forming the structures are arranged relatively loosely in relation to each other. The fluffy cellulose blank structures 2 are used for an efficient forming of the cellulose products 1, allowing the cellulose fibres to form the cellulose products 1 in an efficient way during the forming process.

As illustrated in for example FIGS. 1a, 2a, 3a-b, 4a-b, 7a-e, 8a, and 9a-b, the cellulose blank structure 2 comprises one or more defined product sections 2a and a defined residual section 2b. The one or more product sections 2a are defined as areas or portions of the cellulose blank structure 2 that are corresponding to the positions of the one or more forming moulds 3 when forming the cellulose products 1. The residual section 2b is surrounding or arranged in connection to the one or more product sections 2a. Before the forming operations in the forming mould system, at least a portion of the residual section 2b is compressed to a first degree of compression $D_{C1}$ higher than a degree of compression $D_C$ of the one or more product sections 2a, as understood from the figures. The one or more product sections 2a may be non-compressed or alternatively at least a portion of one or more product sections 2a is compressed to a second degree of compression $D_{C2}$.

In certain embodiments, the cellulose blank structure 2 may comprise one or more defined residual sections 2b, where each residual section 2b is surrounding or arranged in connection to one or more product sections 2a. Before the forming operations in the forming mould system, at least a portion of each residual section 2b is compressed to a first degree of compression $D_{C1}$ higher than a degree of compression $D_C$ of the one or more product sections 2a.

As shown in the illustrated embodiments, the residual section 2b is suitably compressed to the first degree of compression $D_{C1}$. The residual section 2b may be compressed to the first degree of compression $D_{C1}$ with a density in the range of 40-1300 kg/m³. The density of the residual section 2b may be measured by cutting out a sample piece of material directly after the cellulose blank structure 2 has been compressed, for example between compacting rollers. The thickness of the sample piece from the residual section 2b is measured with a caliper within one minute from the compression, and thereafter the sample piece is weighed. The sample piece suitably has a square or circular shape with an area in the range of 400-2000 mm². When measuring the thickness of the sample piece with the caliper, a pressure of 0.5 kPa is applied onto the whole surface of the sample piece. The weight [m] of the sample piece together with the thickness [t] and area [A] are used for calculating the density [ρ] according to the formula:

$$\rho = \frac{m}{At}$$

In FIG. 1a, a first sample piece P1 of the residual section 2b is indicated with dotted lines for illustrative purposes, and in the shown embodiment, the first sample piece P1 has a square shape. A first area A1 and a first thickness direction T1 of the first sample piece P1 is indicated in FIG. 1a.

The residual section 2b may have an embossed pattern, such as for example a waffled surface structure, on one or both sides to enhance the stiffness and strength of the cellulose blank structure 2.

The cellulose blank structure 2 further comprises one or more transition sections 2c arranged between the one or more product sections 2a and the residual section 2b. In the transition sections 2c, the degree of compression may vary between the first degree of compression $D_{C1}$ and the degree of compression $D_C$ of the one or more product sections 2a. The transition sections 2c may have other degrees of compression if suitable.

In certain embodiments, the one or more product sections 2a are compressed to a second degree of compression $D_{C2}$ prior to the feeding of the cellulose blank structure 2 to the forming position $F_{POS}$. The first degree of compression $D_{C1}$ is higher than the second degree of compression $D_{C2}$. The one or more product sections 2a may suitably be compressed to the second degree of compression $D_{C2}$ with a density in the range of 15-400 kg/m³. The density of the one or more product sections 2a may be measured by cutting out a sample piece of material directly after the cellulose blank structure 2 has been compressed, for example between compacting rollers. The thickness of the sample piece from the one or more product sections 2a is measured with a caliper within one minute from the compression, and thereafter the sample piece is weighed. The sample piece suitably has a square or circular shape with an area in the range of 400-2000 mm². When measuring the thickness of the sample piece with the caliper, a pressure of 0.5 kPa is applied onto the whole surface of the sample piece. The weight [m] of the sample piece together with the thickness [t] and area [A] are used for calculating the density [ρ] according to the formula:

$$\rho = \frac{m}{At}$$

In FIG. 1a, a second sample piece P2 of the one or more product sections 2b is indicated with dotted lines for illustrative purposes, and in the shown embodiment, the second sample piece P2 has a square shape. A second area A2 and a second thickness direction T2 of the second sample piece P2 is indicated in FIG. 1a.

As shown in FIG. 1b, the forming mould system S may further comprise a compacting unit 11 configured for compacting or compressing the residual section 2b to the first degree of compression $D_{C1}$ higher than the degree of compression $D_C$ of the one or more product sections 2a. The compacting unit 11 comprises a first compacting roller 11a that is cooperating with a second compacting roller 11b. The compacting rollers are arranged on opposite sides of the cellulose blank structure 2, and when the cellulose blank structure 2 is fed between the first compacting roller 11a and the second compacting roller 11b a compression of the cellulose blank structure 2 is accomplished. As shown in FIG. 1b, the first compacting roller 11a comprises a plurality of recesses 12 that are forming the product sections 2a, and the area of the first compacting roller 11a between the recesses 12 is forming the residual section 2b of the cellulose blank structure 2 with a higher degree of compression. Each of the recesses 12 has a shape and configuration corresponding to the product sections 2a. The recesses 12 may be used for compressing the product sections 2a to the second degree of compression $D_{C2}$, where the second degree of compression $D_{C2}$ is lower than the first degree of compression $D_{C1}$. In an alternative non-illustrated embodiment, the second compacting roller 11b may be arranged with recesses that are corresponding to the recesses 12 of the first compacting roller 11a for forming the product sections 2a.

The forming mould system S may further comprise a cutting unit 9, configured for establishing one or more cutting patterns 4 in the cellulose blank structure 2. The cellulose blank structure 2 may be arranged with a cutting pattern 4 in the residual section 2b and/or the transition section 2c at least partly around each product section 2a, as illustrated in FIGS. 2a-b, 3a-b, 4a-b, 5a-e, 6a-c, and 7a-e. Each cutting pattern 4 is in the illustrated embodiments partly separating a part of the cellulose blank structure 2 in connection to a product section 2a from the rest of the cellulose blank structure 2. Each cutting pattern 4 is forming at least one bridging structure 4a in the residual section 2b and/or the transition section 2c. The bridging structures 4a are connecting the parts of the cellulose blank structure 2 in connection to the product sections 2a and the rest of the cellulose blank structure 2, allowing displacements of the parts of the cellulose blank structure 2 in connection to the product sections 2a, as shown in for example FIGS. 5b-c and 6b. The displacements are facilitating the forming of the cellulose products 1 in the one or more forming moulds 3, especially if the cellulose products 1 are having deep drawn configurations. The cutting patterns 4 may have any suitable configuration for forming the bridging structures 4a.

Figure 2B:
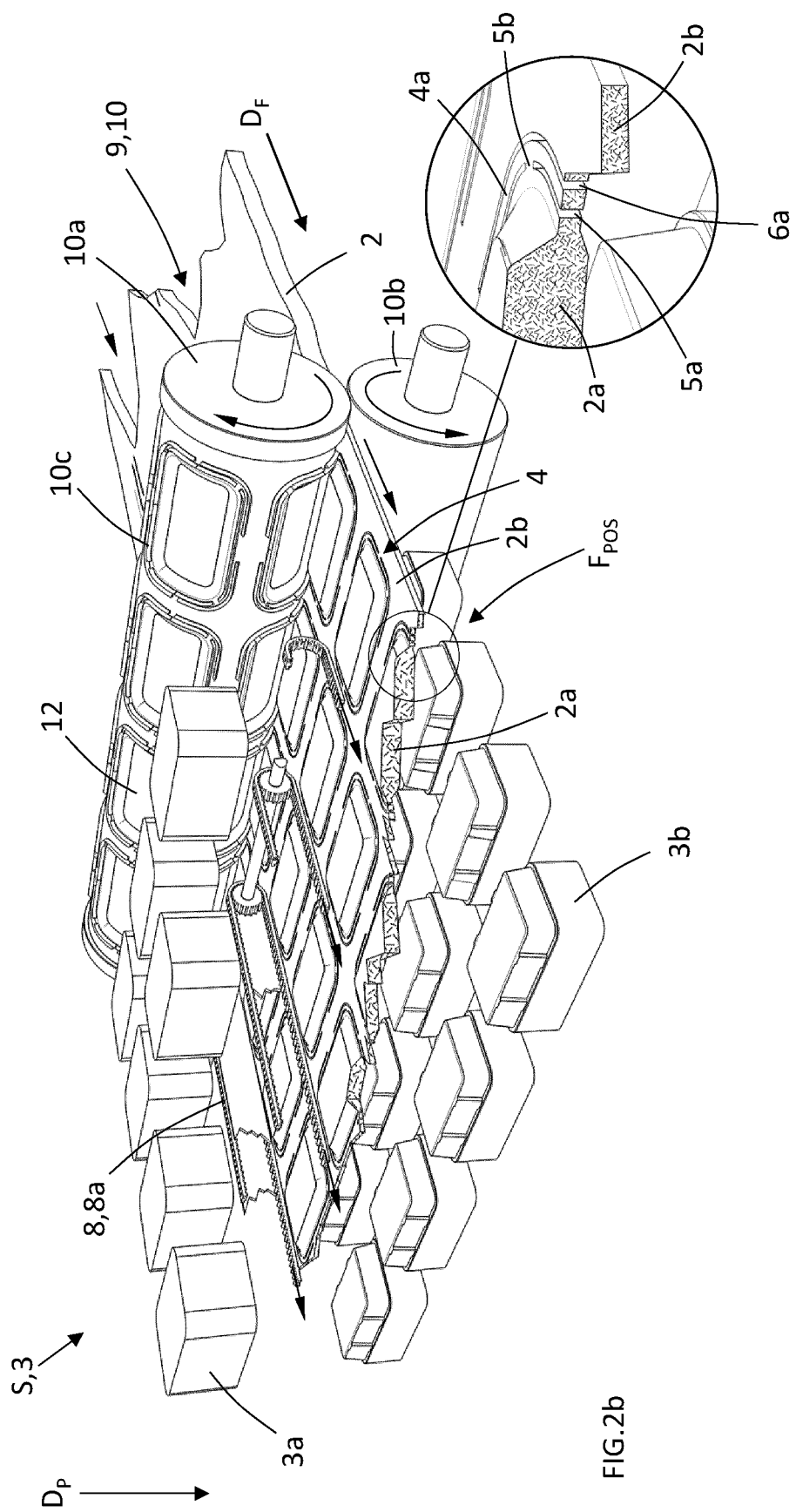
Figure 3A:
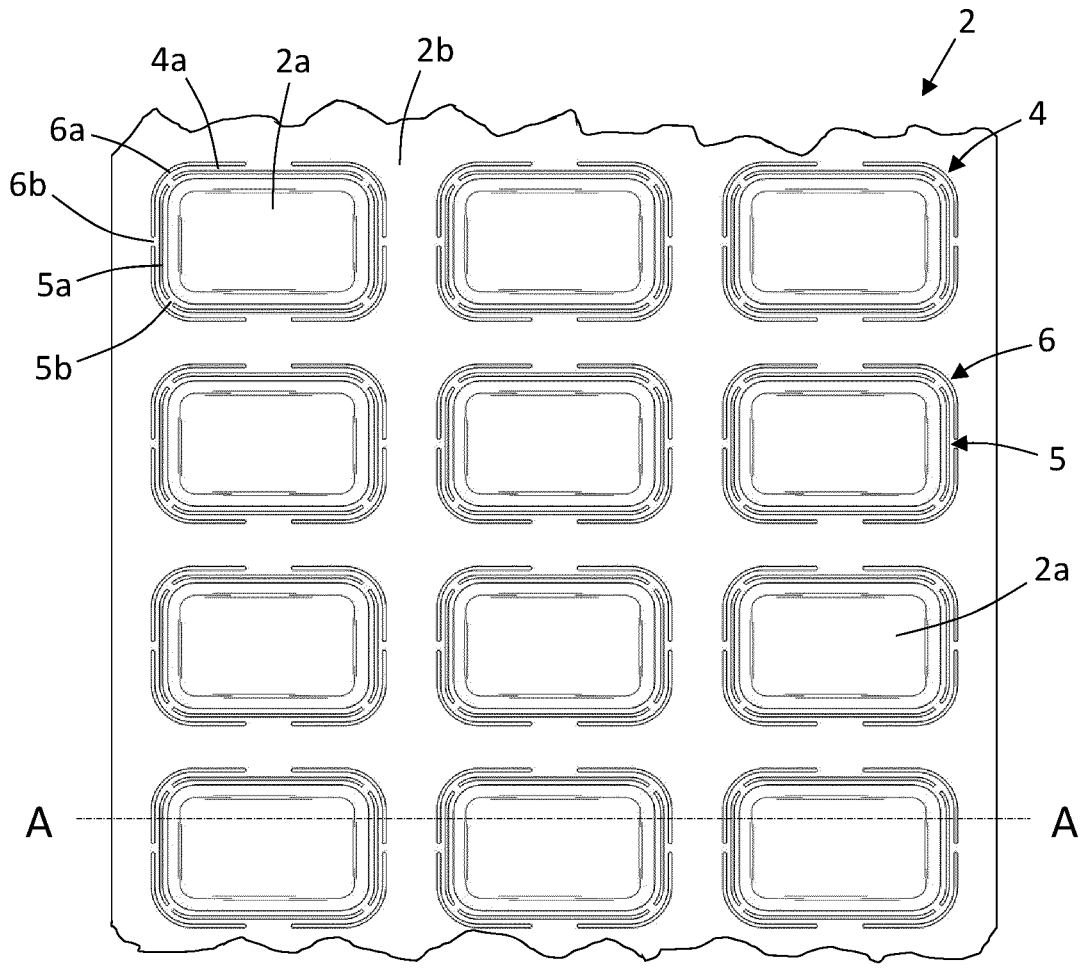
FIG. 3a-b show schematically in a view from above and in a front view, the cellulose blank structure with cutting patterns in a multi-cavity configuration, according to the disclosure.
Figure 3B:
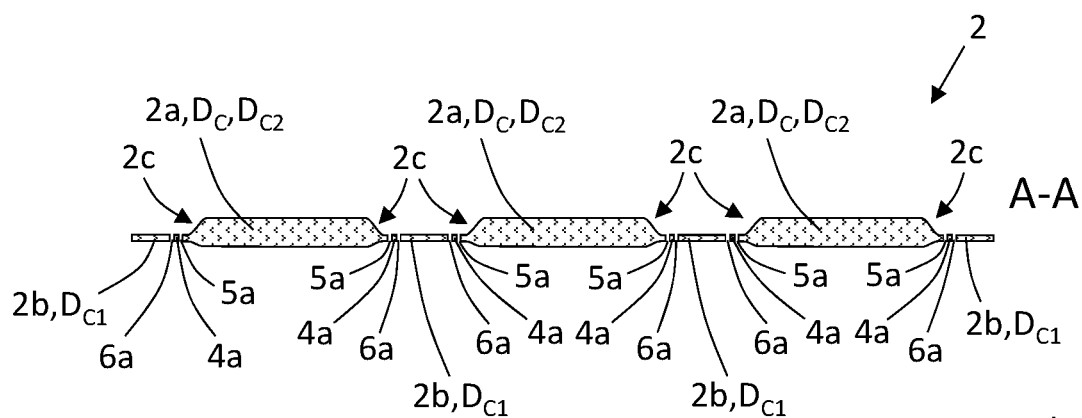
Figure 4A:
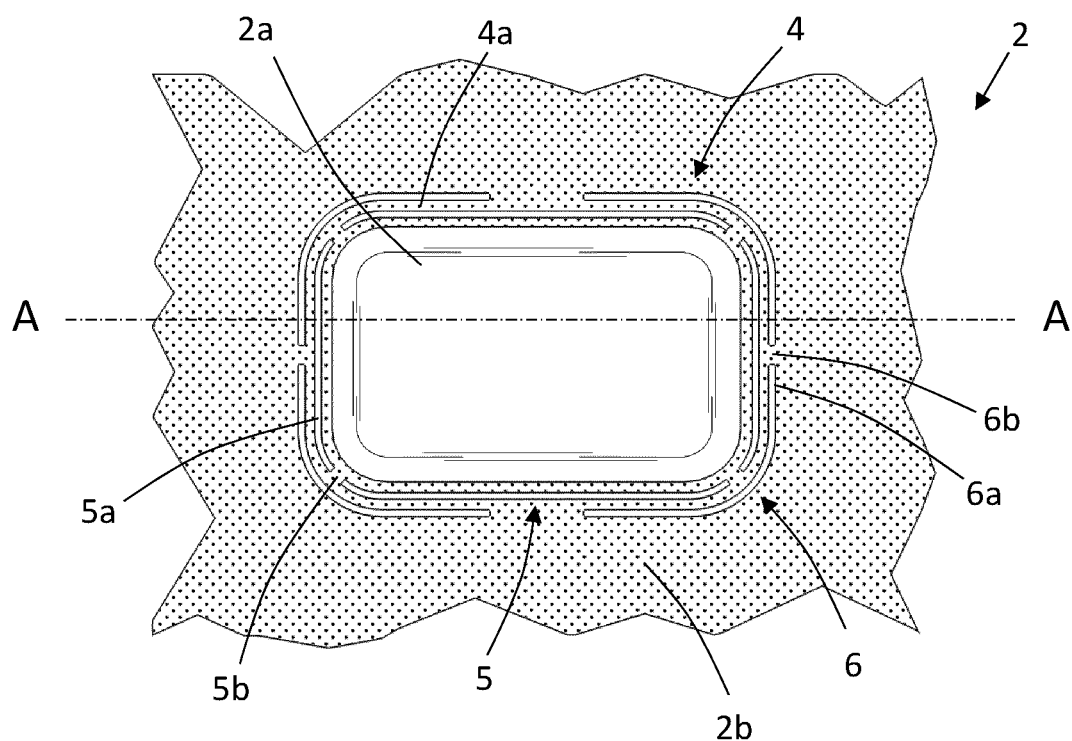
FIG. 4a-b show schematically in a view from above and in a front view, the cellulose blank structure with cutting patterns in a single-cavity configuration or a section of the multi-cavity configuration, according to the disclosure.
Figure 4B:
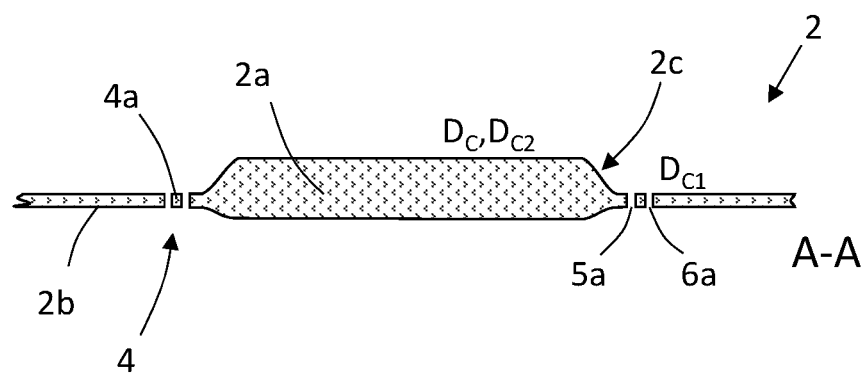
Figure 9A:
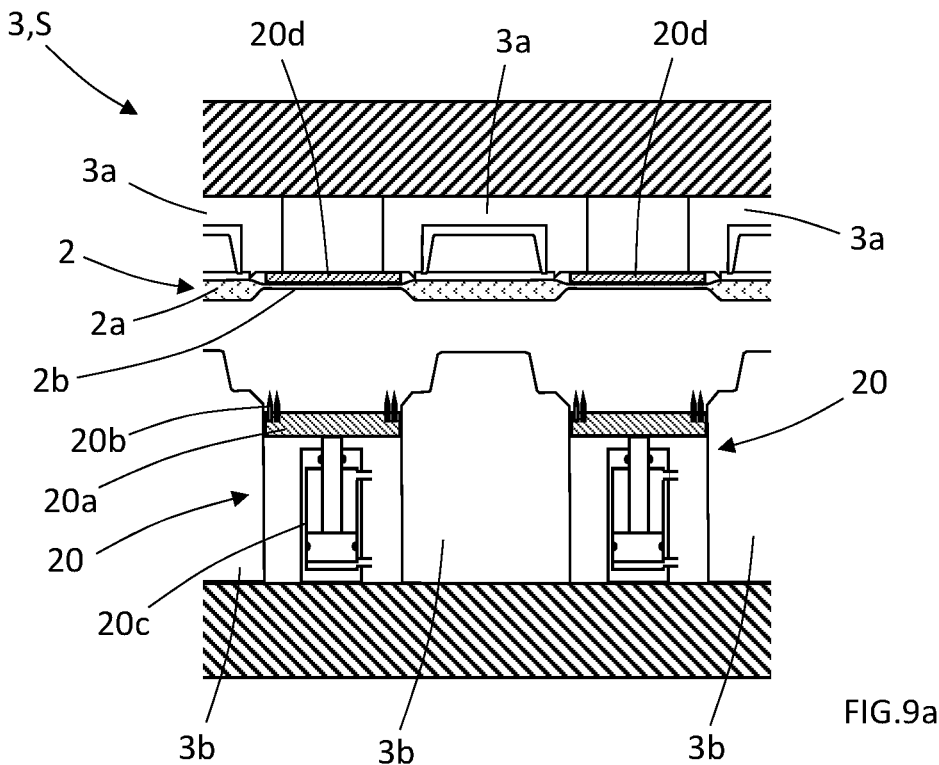
FIG. 9a-b show schematically in front views, a forming mould system with a cutting unit, according to an alternative embodiment of the disclosure.
Figure 9B:
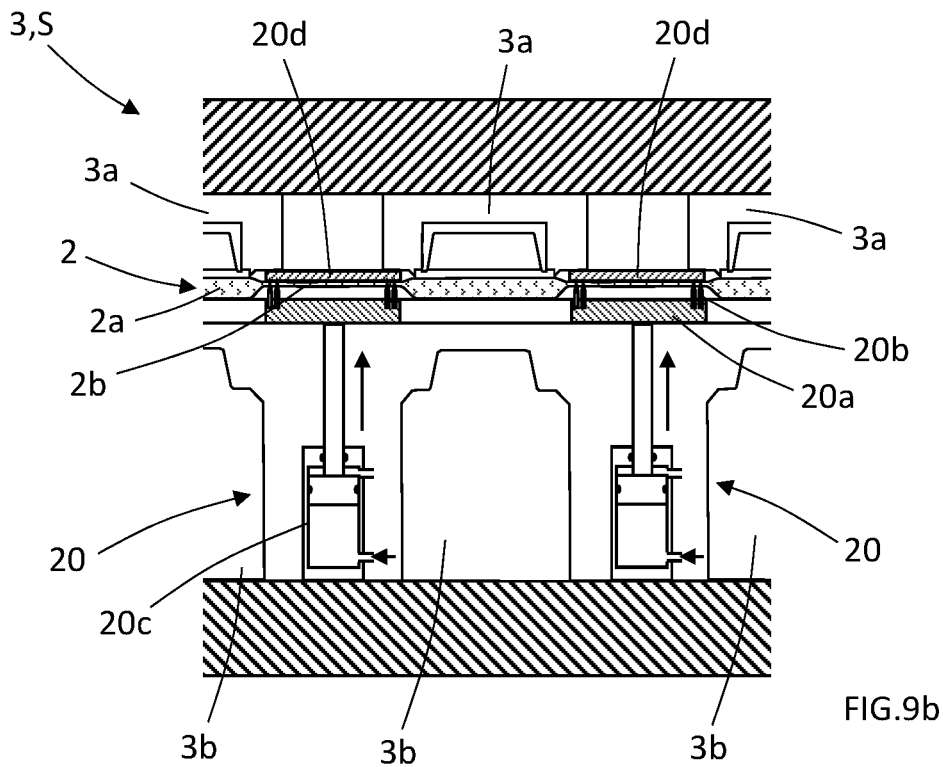

The cutting unit 9 may be arranged as a separate unit upstream the one or more forming moulds 3, as shown in FIG. 2b, or as one or more arrangements in connection to the one or more forming moulds 3, as shown in FIGS. 9a-b. The cutting units described below may be used in connection with different embodiments of the forming mould system S.

In the embodiment illustrated in FIGS. 2b-c, the cutting unit 9 is configured as a rotary die cutter 10. The shown rotary die cutter 10 comprises a die cutter 10a and an anvil roll 10b. The die cutter 10a comprises a plurality of cutting elements 10c that are forming the cutting patterns 4 in the cellulose blank structure 2 when the cellulose blank structure 2 is fed between the die cutter 10a and the anvil roll 10b. The cutting elements 10c thus have a configuration that is corresponding to the shape of the cutting patterns 4. The rotary die cutter 10 may also have the function as a compacting roller in a similar way as described above in connection to FIG. 1b. As shown in FIG. 2b, the die cutter 10a comprises a plurality of recesses 12 that are forming the product sections 2a, and the area of the die cutter 10a between the recesses 12 is forming the residual section 2b of the cellulose blank structure 2 with a higher degree of compression. Each of the recesses 12 has a shape and configuration corresponding to the product sections 2a. The recesses 12 may be used for compressing the product sections 2a to the second degree of compression $D_{C2}$, where the second degree of compression $D_{C2}$ is lower than the first degree of compression $D_{C1}$. In an alternative non-illustrated embodiment, the anvil roll 2b may be arranged with recesses that are corresponding to the recesses 12 of the die cutter 10a for forming the product sections 2a. With this configuration, the forming of the one or more cutting patterns 4 and the compressing of the cellulose blank structure 2 are established in a single operational step with the rotary die cutter 10.

The cutting unit 9 may have other suitable configurations. In the embodiment illustrated in FIGS. 9a-b, the cutting unit 9 is configured as a press cutting device 20 arranged in connection to the forming moulds 3 of the forming mould system S. The press cutting device 20 comprises a movably arranged common plate structure 20a with a plurality of cutting elements 20b with cutting edges that are forming the cutting patterns 4 in the cellulose blank structure 2 when the cellulose blank structure 2 is arranged between the first mould parts 3a and the second mould parts 3b. In the same way as described above, the cutting patterns 4 are formed in the residual section 2b and/or the transition section 2c at least partly around each product section 2a, and the cutting elements 20b thus have a configuration that is corresponding to the shape of the cutting patterns 4. The plate structure 20a with the cutting elements 20b is in a non-cutting position shown in FIG. 9a arranged in connection to the second mould parts 3b. In FIG. 9a, a pre-formed cellulose blank structure 2 with product sections 2a and residual sections 2b is arranged in connection to the first mould parts 3a. The press cutting device 20 further comprises pressure cylinders 20c that are arranged for displacing the plate structure 20a with the cutting elements 20b from the non-cutting position to a cutting position shown in FIG. 9b. In FIG. 9b, the cutting elements 20b meet an anvil structure 20d arranged in connection to the first mould parts 3a for establishing the cutting patterns 4 in the cellulose structure. The anvil structure 20d may be made of a suitable material, such as for example a flexible plate structure made of polyurethane. When the cutting patterns 4 have been formed in the cellulose blank structure 2, the plate structure 20a with the cutting elements 20b are displaced back to the position shown in FIG. 9a, allowing a product forming operation to be performed.

In certain embodiments, each cutting pattern 4 comprises a first cut 5 arranged around and in connection to a corresponding product section 2a, where the first cut 5 comprises a first cut line 5a with a first intermediate section 5b forming the at least one bridging structure 4a.

Figure 7A:
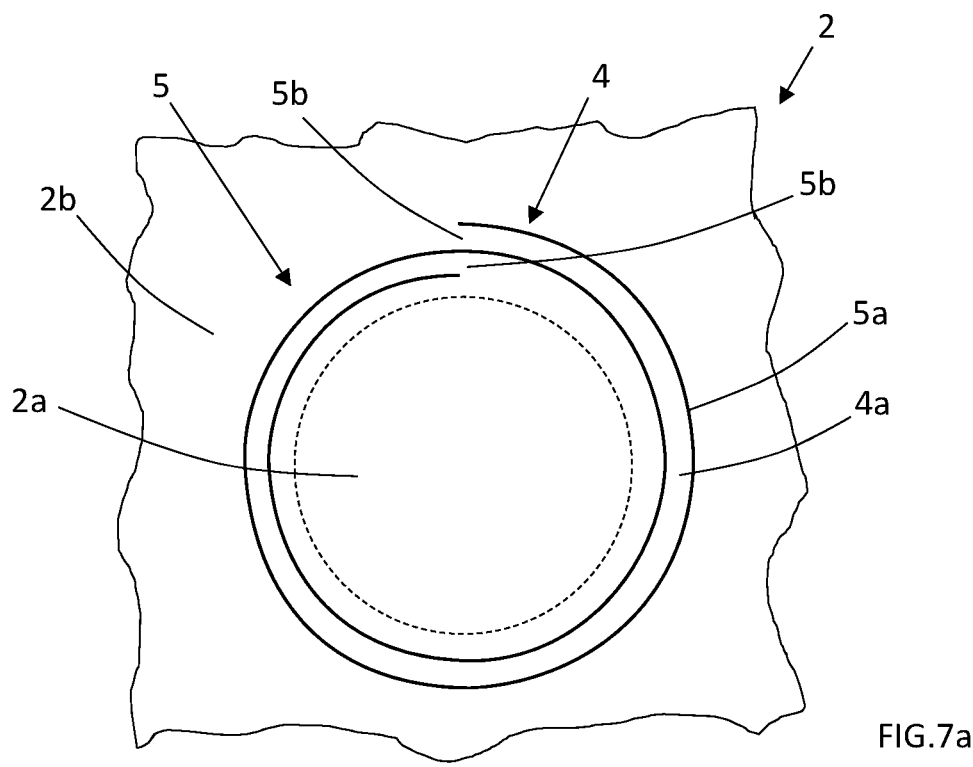
FIG. 7a-e show schematically in views from above, the cellulose blank structure with different cutting patterns, according to the disclosure.
Figure 7B:
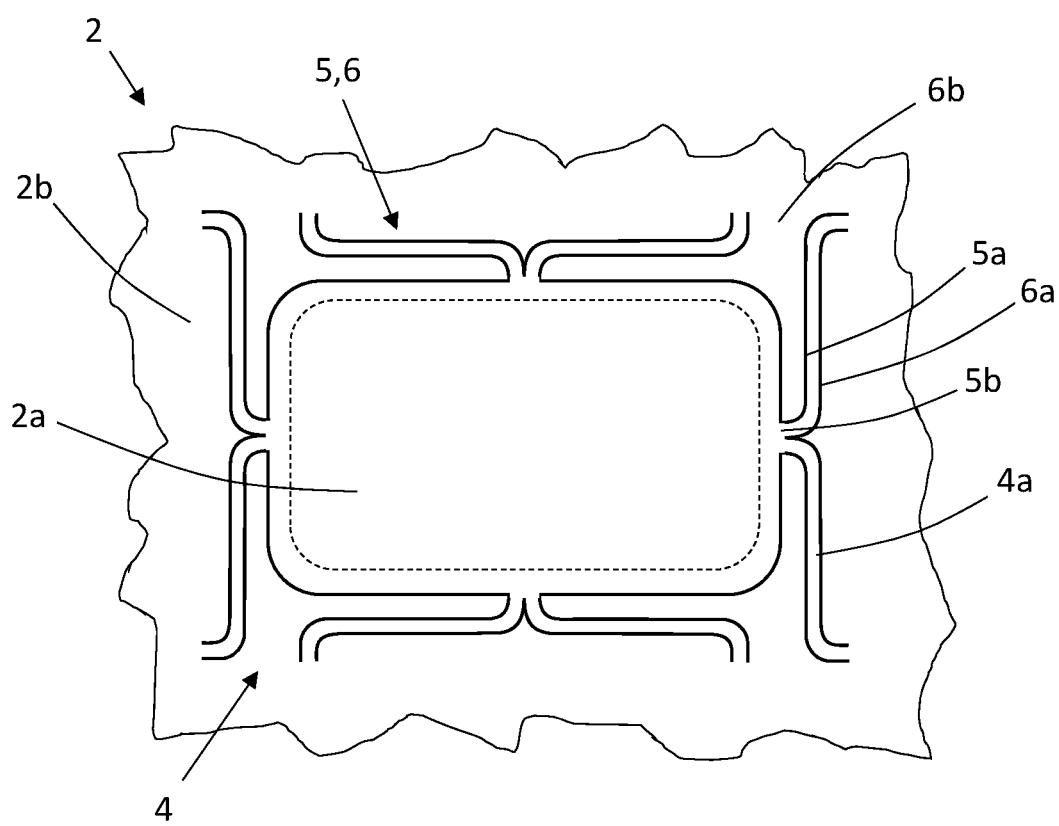

In FIG. 7a, an exemplified cutting pattern 4 with a spiral shape is schematically illustrated, where the first cut 5 is arranged around and in connection to the product section 2a. The first cut 5 comprises the first cut line 5a with the first intermediate section 5b between overlapping sections of the first cut line 5a, as shown in the figure. The intermediate section 5b is forming the at least one bridging structure 4a.

In alternative embodiments, each cutting pattern 4 comprises a non-continuous first cut 5 arranged around and in connection to a corresponding product section 2a, and a non-continuous second cut 6 arranged around and outwards of the non-continuous first cut 5 relative to the product section 2a. The non-continuous first cut 5 comprises one or more first cut lines 5a with one or more first intermediate sections 5b between the one or more first cut lines 5a. The non-continuous second cut 6 comprises one or more second cut lines 6a with one or more second intermediate sections 6b between the one or more second cut lines 6a. The one or more first intermediate sections 5b and the one or more second intermediate sections 6b are forming the at least one bridging structure 4a.

In FIGS. 2c, 3a-b, 4a-b, 6b, and 7b, exemplified cutting patterns 4 are illustrated where the cutting patterns 4 comprise the non-continuous first cut 5 arranged around and in connection to a corresponding product section 2a, and the non-continuous second cut 6 arranged around and outwards of the non-continuous first cut 5 relative to the product section 2a. The non-continuous first cut 5 comprises a plurality of first cut lines 5a with first intermediate sections 5b between the first cut lines 5a. The non-continuous second cut 6 comprises a plurality of second cut lines 6a with second intermediate sections 6b between the second cut lines 6a. The first intermediate sections 5b and the second intermediate sections 6b are forming the bridging structures 4a. The non-continuous first cut 5 and the non-continuous second cut 6 may as illustrated be arranged in an overlapping relationship relative to each other, where the one or more first cut lines 5a are overlapping the one or more second intermediate sections 6b and the one or more second cut lines 6a are overlapping the one or more first intermediate sections 5b.

In alternative embodiments, each cutting pattern 4 may further comprise at least one non-continuous additional cut 7 arranged around and outwards of the non-continuous second cut 6 relative to the product section 2a, where each of the at least one non-continuous additional cut 7 comprises one or more additional cut lines 7a with one or more additional intermediate sections 7b between the one or more additional cut lines 7a.

Figure 7C:
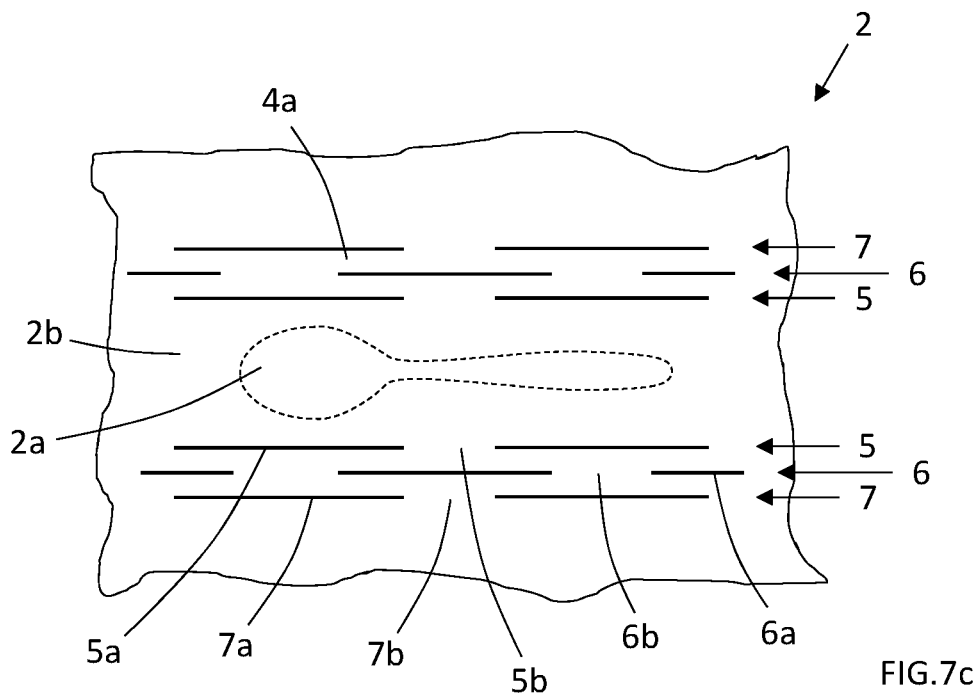
Figure 7D:
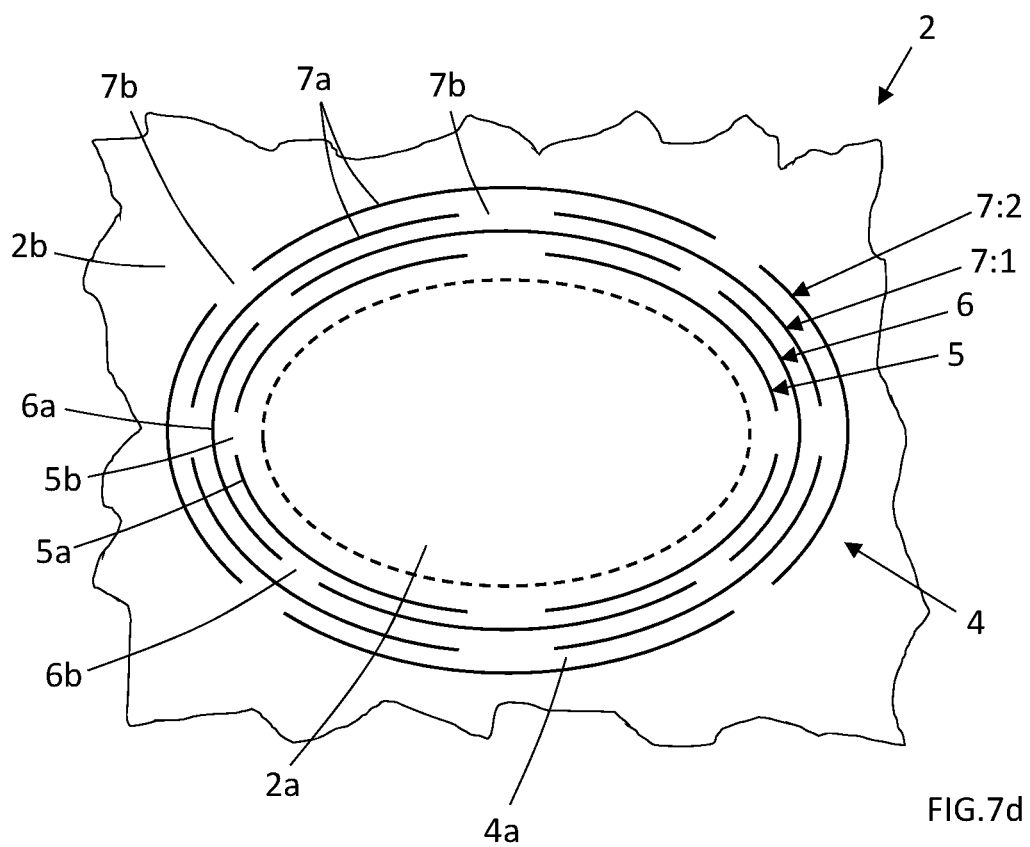

In FIG. 7c, an exemplified cutting pattern 4 is illustrated where the cutting pattern 4 comprise the non-continuous first cut 5 arranged around and in connection to a corresponding product section 2a, the non-continuous second cut 6 arranged around and outwards of the non-continuous first cut 5 relative to the product section 2a, and one non-continuous additional cut 7 arranged around and outwards of the non-continuous second cut 6 relative to the product section 2a. The non-continuous additional cut 7 comprises a plurality of additional cut lines 7a with additional intermediate sections 7b between the additional cut lines 7a. In FIG. 7d, an exemplified cutting pattern 4 is illustrated where the cutting pattern 4 comprise the non-continuous first cut 5 arranged around and in connection to a corresponding product section 2a, the non-continuous second cut 6 arranged around and outwards of the non-continuous first cut 5 relative to the product section 2a, and two non-continuous additional cuts 7 arranged around and outwards of the non-continuous second cut 6 relative to the product section 2a. A non-continuous first additional cut 7:1 is arranged around and outwards of the non-continuous second cut 6 relative to the product section 2a, and a non-continuous second additional cut 7:2 is arranged around and outwards of the non-continuous first additional cut 7:1 relative to the product section 2a. Each of the non-continuous additional cuts 7 comprises a plurality of additional cut lines 7a with additional intermediate sections 7b between the additional cut lines 7a.

In alternative embodiments, each cutting pattern 4 may instead comprise only a non-continuous first cut 5 arranged around and in connection to a corresponding product section 2a. The non-continuous first cut 5 comprises one or more first cut lines 5a with one or more first intermediate sections 5b between the one or more first cut lines 5a, and the one or more first intermediate sections 5b are forming the at least one bridging structure 4a.

Figure 7E:
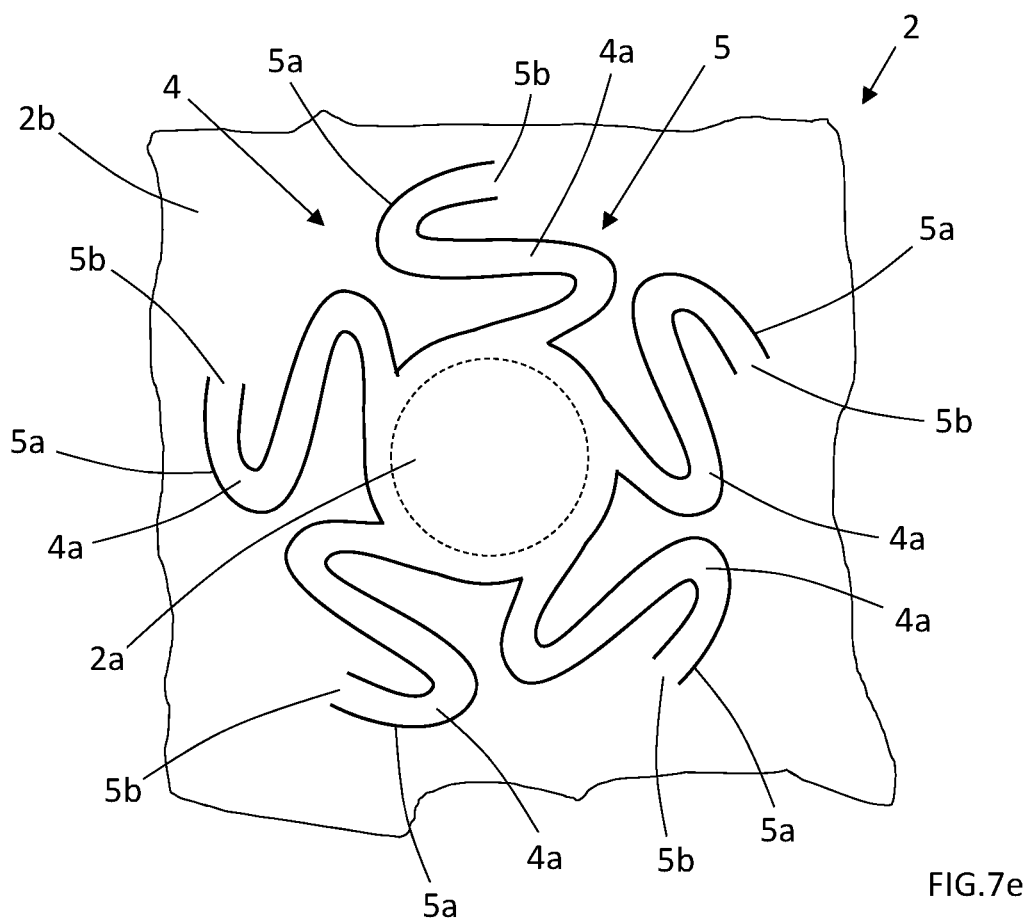

In FIG. 7e, an exemplified cutting pattern 4 comprising only a non-continuous first cut 5 arranged around and in connection to a corresponding product section 2a is illustrated. The non-continuous first cut 5 comprises a plurality of first cut lines 5a with first intermediate sections 5b between the first cut lines 5a. The first intermediate sections 5b are forming the bridging structures 4a.

Each cut 5, 6, 7 is suitably extending through the cellulose blank structure 2. In alternative non-illustrated embodiments, at least one of the intermediate sections 5b, 6b, 7b comprise a cut extending partly through the cellulose blank structure 2.

In alternative non-illustrated embodiments, some of the intermediate sections 5b, 6b, 7b may be made narrow and configured to break during forming of the cellulose products 1. The narrow configuration of the intermediate sections 5b, 6b, 7b are allowing transportation of the cellulose blank structure 2 without breakage or separation, for a secure positioning of the cellulose blank structure 2 in relation to the one or more forming moulds 3.

As described above, the forming mould system S comprises one or more forming moulds 3, where each forming mould 3 comprises the first mould part 3a and the second mould part 3b, which are cooperating with each other during the forming of the cellulose products 1. The first mould part 3a and the second mould part 3b are movably arranged in relation to each other, and the first mould part 3a and the second mould part 3b are configured for moving in relation to each other in a pressing direction $D_P$. In the embodiment illustrated in FIGS. 5a-e, the second mould part 3b is stationary and the first mould part 3a is movably arranged in relation to the second mould part 3b in the pressing direction $D_P$. As indicated with the double arrow in FIG. 5a, the first mould part 3a is configured to move both towards the second mould part 3b and away from the second mould part 3b in linear movements along an axis extending in the pressing direction $D_P$.

In alternative embodiments, the first mould part 3a may be stationary with the second mould part 3b movably arranged in relation to the first mould part 3a, or both mould parts may be movably arranged in relation to each other.

The forming mould system S may be of a single-cavity configuration or alternatively of a multi-cavity configuration. A single-cavity forming mould system comprises only one forming mould 3 with first and second mould parts. A multi-cavity forming mould system comprises two or more forming moulds 3, each having first and second mould parts. In FIGS. 1b and 2b, the forming mould system S is arranged as a multi-cavity forming mould system comprising a plurality of forming moulds 3 with first and second mould parts, where the movements of the mould parts suitably are synchronized for a simultaneous forming operation. The part of the forming mould system S shown in FIGS. 5a-e and 6a-c could illustrate the single-cavity configuration, or alternatively a section of the multi-cavity configuration. In the following, the forming mould system S will be described in connection to a multi-cavity forming mould system, but the disclosure is equally applicable on a single-cavity forming mould system.

It should be understood that for all embodiments according to the disclosure, the expression moving in the pressing direction $D_P$ includes a movement along an axis extending in the pressing direction $D_P$, and the movement may take place along the axis in opposite directions. The expression further includes both linear and non-linear movements of a mould part for all embodiments, where the result of the movement during forming is a repositioning of the mould part in the pressing direction $D_P$.

To form the cellulose products 1 from the air-formed cellulose blank structure 2 in the forming mould system S, the air-formed cellulose blank structure 2 is first provided from a suitable source. The cellulose blank structure 2 may be air-formed from cellulose fibres and arranged on rolls or in stacks. The rolls or stacks may thereafter be arranged in connection to the forming mould system S. As an alternative, the cellulose blank structure 2 may be air-formed from cellulose fibres in connection to the forming mould system S and directly fed to the mould parts.

The forming mould system S further comprises a feeding unit 8 configured for feeding the cellulose blank structure 2 in a feeding direction $D_F$ to a forming position $F_{POS}$ in the forming mould system S. As shown in for example FIGS. 1b, 2b, 5a-e, and 6a-c the feeding unit 8 comprises one or more feeder belts 8a that are used for transporting the cellulose blank structure 2 in the feeding direction $D_F$ to the forming position $F_{POS}$ between the first mould part 3a and the second mould part 3b. The feeder belts 8a are further used for holding the cellulose blank structure in position during the forming process. The feeder belts 8a may have any suitable configuration for transporting the cellulose blank structure 2. In FIGS. 6a-b, the feeder belts 8a are schematically illustrated in perspective views. The feeder belts 8a may be of vacuum-type with suction channels 8b for holding the cellulose blank structure 2 during transportation, as indicated in FIGS. 6a-c.

In the embodiments illustrated in FIGS. 5a-e and 6a-c, feeder belts 8a are arranged on each side of the first mould parts 3a. The feeder belts 8a are cooperating to transport the cellulose blank structure 2 to the forming position $F_{POS}$ shown in FIG. 5a. In the forming position $F_{POS}$, the cellulose blank structure 2 is arranged between the first mould parts 3a and the second mould parts 3b. The feeding unit 8 may have other suitable configurations, such as feeding rollers.

The feeding unit 8 is feeding the cellulose blank structure 2 in the feeding direction $D_F$ to the forming position $F_{POS}$ in the forming mould system S. In the forming position $F_{POS}$, as understood from FIGS. 1b and 2b, each product section 2a is arranged between a corresponding first mould part 3a and second mould part 3b. The product sections 2a are thus arranged in the cellulose blank structure 2 in a pattern corresponding to the arrangement of the one or more forming moulds 3 in the forming mould system S, as illustrated in FIGS. 1b and 2b.

The first mould parts 3a are arranged for forming the cellulose products 1 through interaction with the corresponding second mould parts 3b. During forming of the cellulose products 1, the cellulose blank structure 2 is in each forming mould 3 exerted to a product forming pressure $P_F$ of at least 1 MPa, preferably in the range of 4-20 MPa, and a product forming temperature $T_F$ in the range of 100° C. to 300° C. The cellulose products 1 are thus formed from the cellulose blank structure 2 between each of the first mould parts 3a and corresponding second mould parts 3b by heating the cellulose blank structure 2 to the forming temperature $T_F$ in the range of 100-300° C., and by pressing the cellulose blank structure 2 with the forming pressure $P_F$ in the range of 1-100 MPa, preferably 4-20 MPa. When forming the cellulose products 1, strong hydrogen bonds are formed between the cellulose fibres in the cellulose blank structure 2 arranged between the first mould parts 3a and the second mould parts 3b. The temperature and pressure levels are for example measured in the cellulose blank structure 2 during the forming process with suitable sensors arranged in or in connection to the cellulose fibres in the cellulose blank structure 2.

Figure 5A:
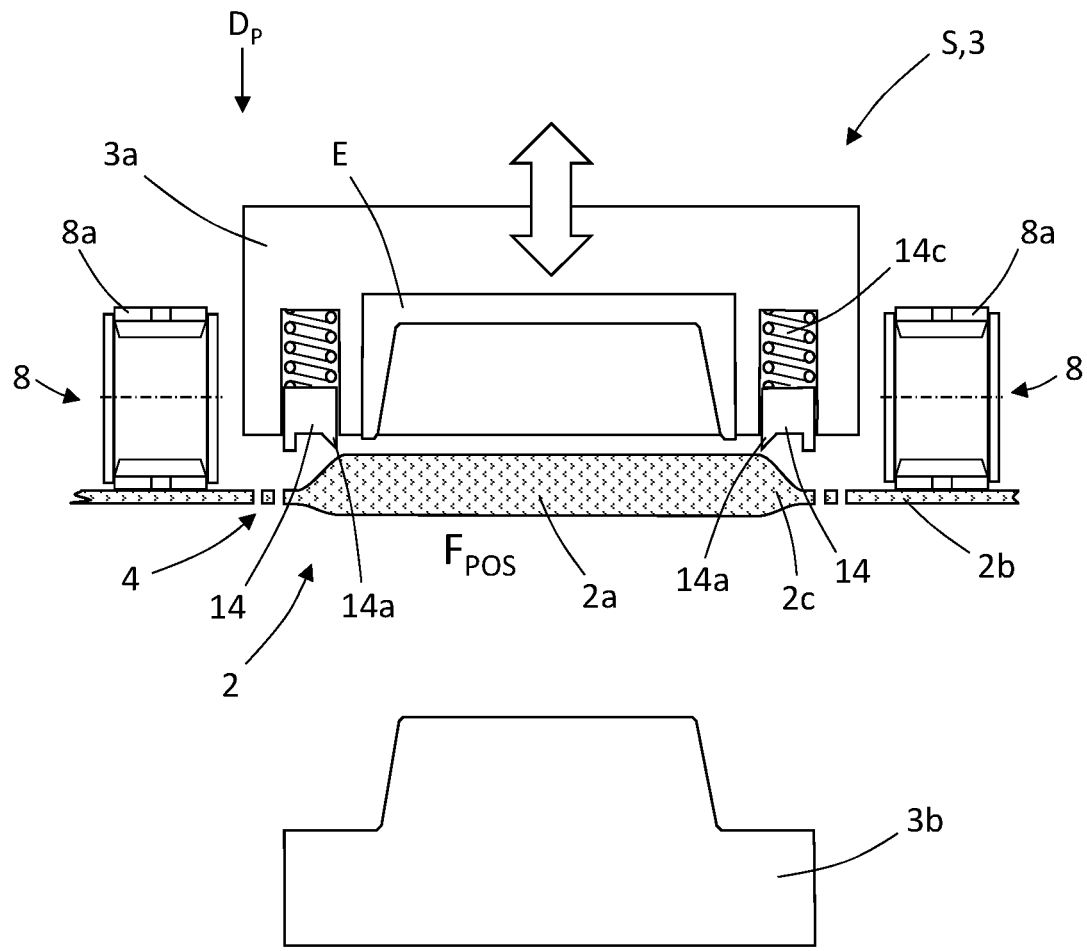
FIG. 5a-e show schematically in front views, the forming mould system, according to the disclosure.
Figure 5B:
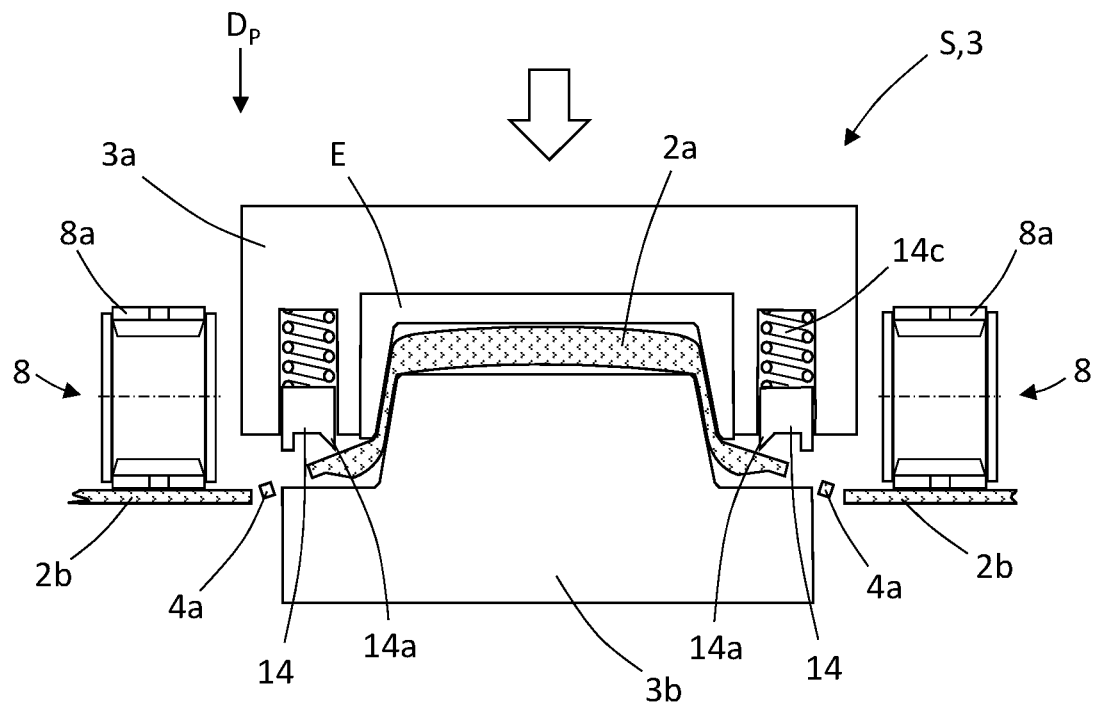

When the cellulose blank structure 2 is arranged in the forming position $F_{POS}$ between the first mould parts 3a and the second mould part 3b, the first mould parts 3a are moved towards the second mould parts 3b in the pressing direction $D_P$, as illustrated with the arrow in FIG. 5b. In FIG. 6b, the position of the cellulose blank structure 2 in FIG. 5b is schematically shown in a perspective view without the first mould part 3a for illustrative purposes. In the forming position $F_{POS}$, the residual section 2b and the one or more product sections 2a may at least partly be displaced relative to each other in a pressing direction $D_P$ of the forming mould system S prior to the forming of the cellulose products 1, as schematically illustrated in FIG. 6b. Upon movement of the first mould parts 3*a* towards the second mould parts 3*b*, the cellulose blank structure 2 is being compacted between the mould parts. In the position illustrated in FIG. 5*d*, the first mould parts 3*a* have been further moved towards the second mould parts 3*b* and reached a product forming position, in which the forming pressure $P_F$ and forming temperature $T_F$ is exerted onto the cellulose blank structure 2. A forming cavity C for forming the cellulose products 1 is formed between each first mould part 3*a* and second mould part 3*b* during forming of the cellulose products 1 when each first mould part 3*a* is pressed towards the corresponding second mould part 3*b* with the cellulose blank structure 2 arranged between the mould parts. The forming pressure $P_F$ and the forming temperature $T_F$ are applied to the cellulose blank structure 2 in each forming cavity C. The forming of the cellulose products 1 may further include a cutting operation, where the cellulose products 1 are cut out from the cellulose blank structure 2 in the forming mould system S during forming of the cellulose products 1. The mould parts may for example be arranged with cutting devices for such an operation. Once the cellulose products 1 have been formed in the forming mould system S, the first mould parts 3*a* are moved in a direction away from the second mould parts 3*b*, as indicated with the arrow in FIG. 5*e*, and the cellulose products 1 can be removed from the forming mould system S, as indicated in FIG. 6*c*, for example by using ejector rods or similar devices.

Figure 5C:
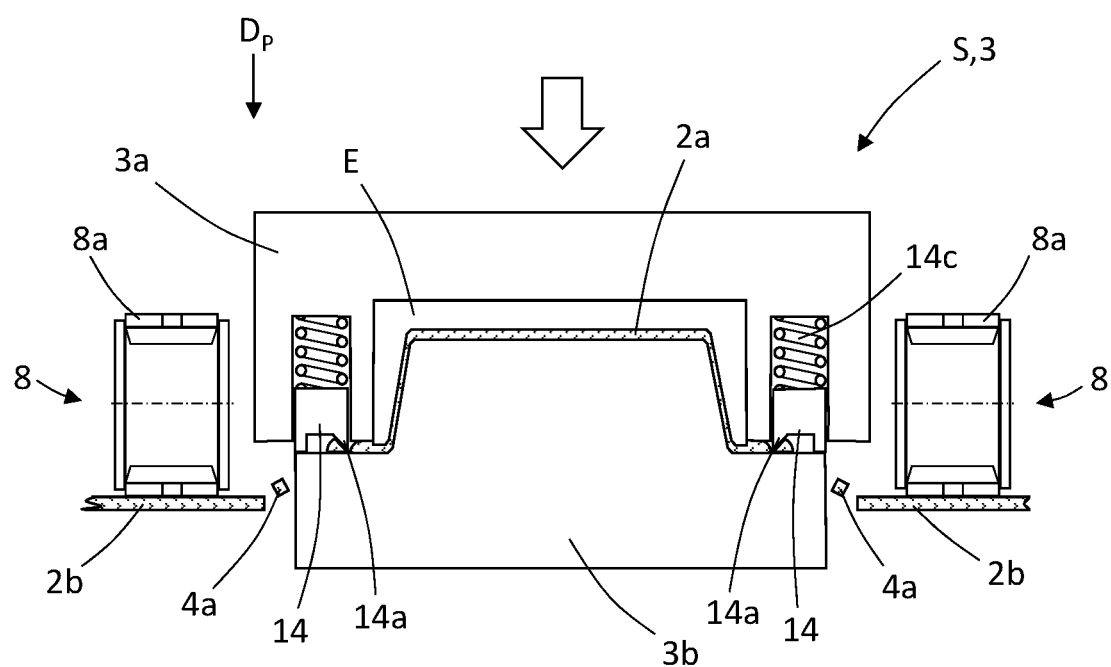
Figure 5D:
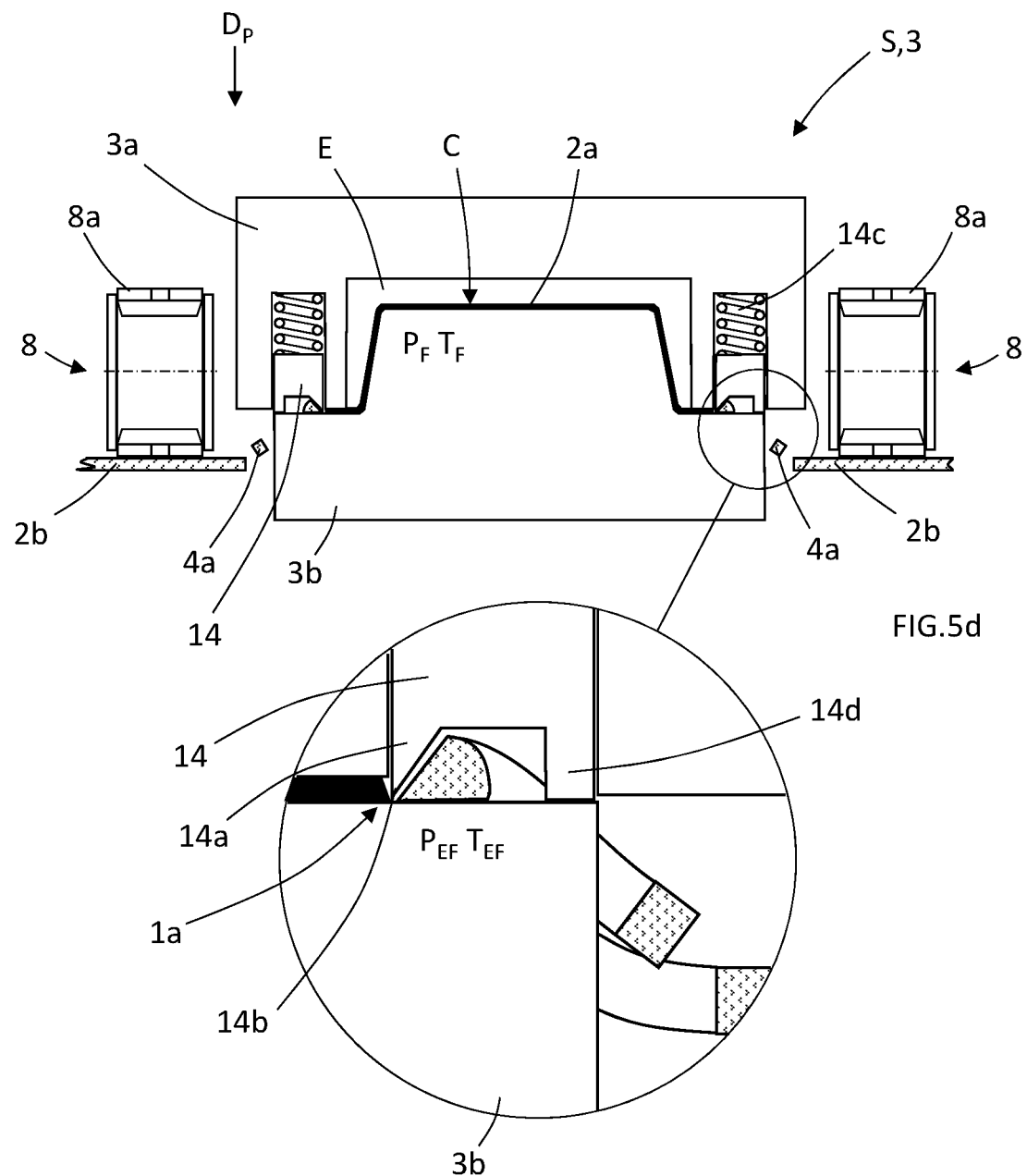
Figure 5E:
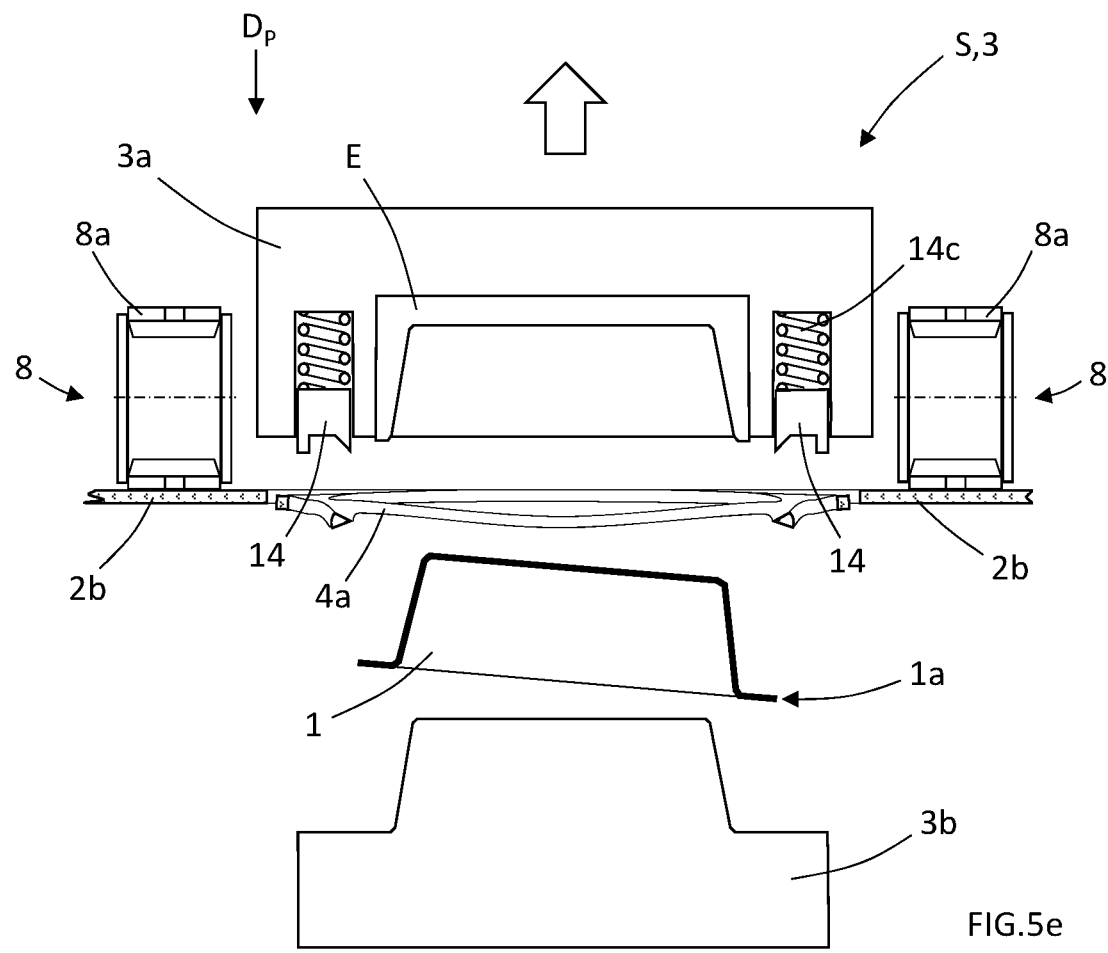
Figure 6A:
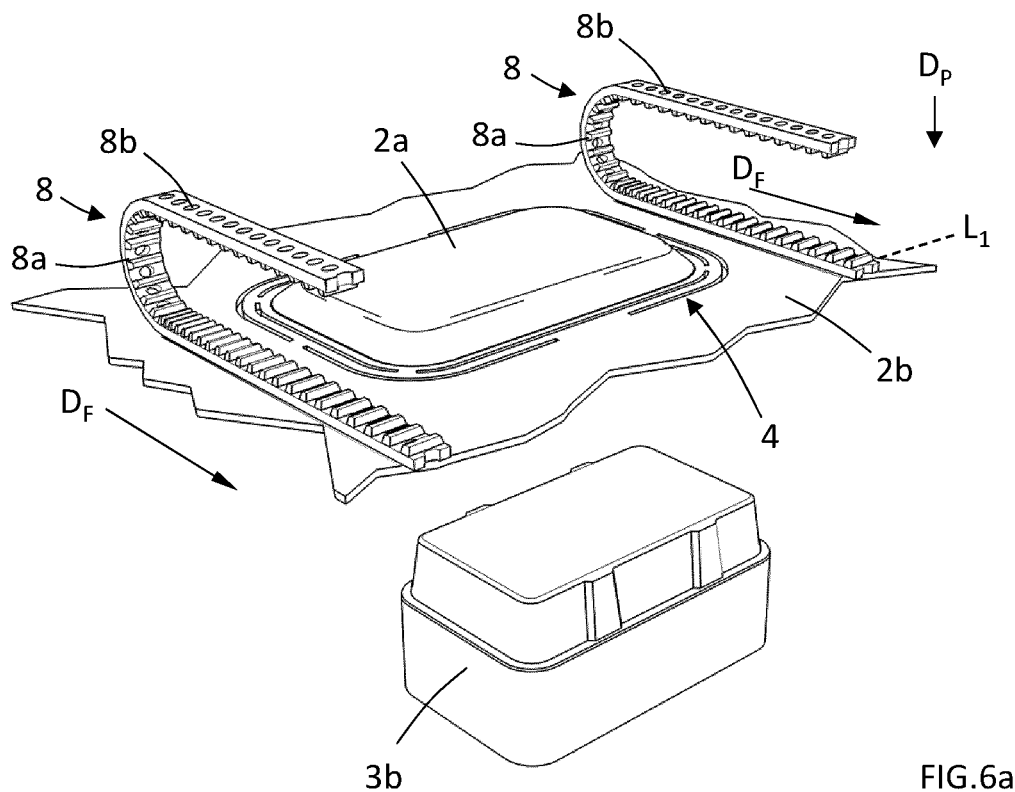
FIG. 6a-c show schematically in perspective views, the forming mould system without a first mould part, and a feeding unit with feeder belts, according to the disclosure.
Figure 6B:
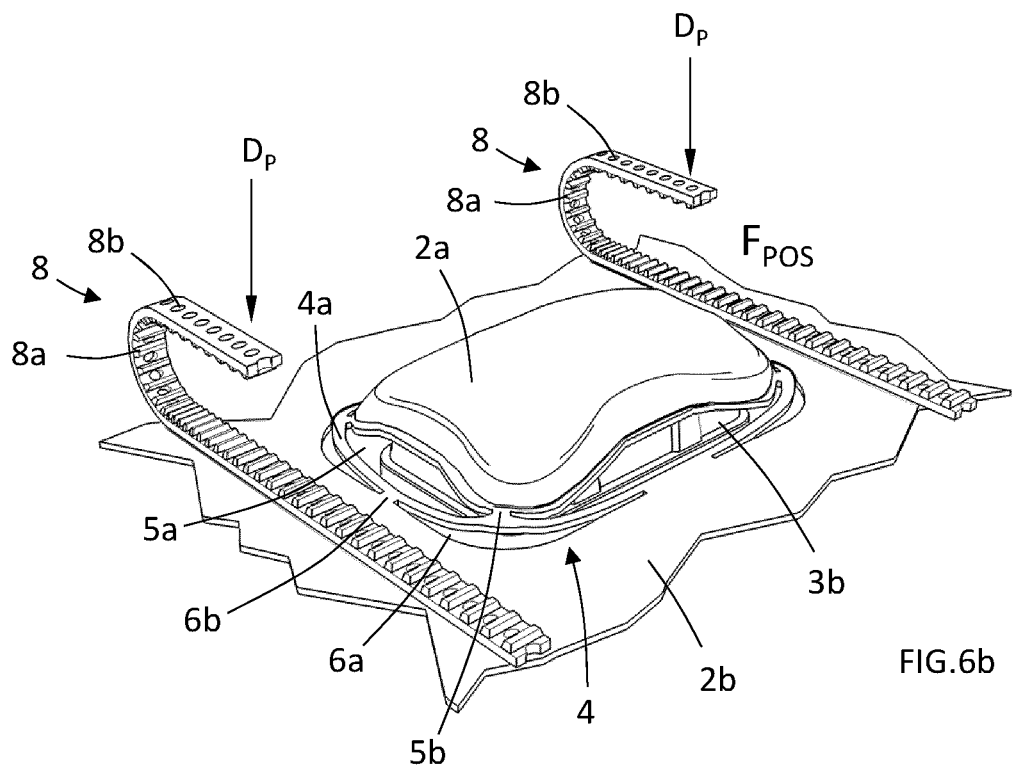
Figure 6C:
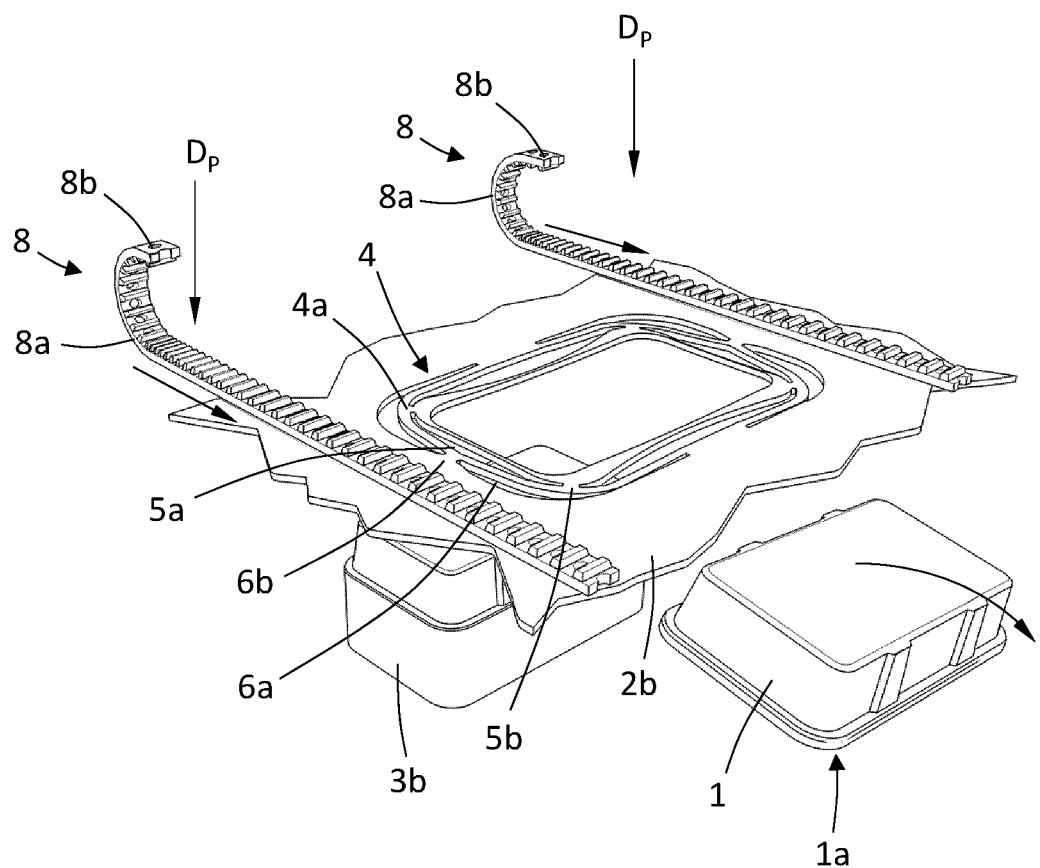

In FIG. 5*c-d*, positions of an exemplified forming mould system S is illustrated, in which an edge-forming operation is taking place for forming edge structures 1*a* of the cellulose products 1. The edge-forming operation may be used instead of a cutting operation for separating the cellulose products 1 from the cellulose blank structure 2 and at the same time forming the edge structures 1*a*. Each of the first mould parts 3*a* comprises an edge-forming device 14 with a protruding element 14*a* configured for compacting and separating fibres of the cellulose blank structure 2. The protruding element 14*a* is arranged with an edge section 14*b* that is facing the second mould part 3*b*. The protruding element 14*a* is suitably arranged as a continuous element extending around the edge-forming device 14, where the protruding element 14*a* has an extension corresponding to the edge shape or outer contour of the cellulose products 1 produced in the forming mould system S. It should however be understood that the protruding element 14*a* may have any suitable extension, such as for example non-continuous, depending on the shape of the cellulose products 1 to be formed. The protruding element 14*a* may further have a pointed cross-sectional configuration with the edge section 14*b*, as shown in FIG. 5*d*. The protruding element 14*a* with the edge section 14*b* may have other suitable cross-sectional configurations in other non-illustrated embodiments, such as a rounded or flat edge section.

The edge-forming device 14 may be movably arranged in relation to a base structure of the first mould part 3*a*, as illustrated in FIGS. 5*a-e*, and the edge-forming device 14 is adapted for interacting with a pressure member arranged in the base structure. The edge-forming device 14 may have any suitable shape and configuration, depending on the shape and configuration of the cellulose products 1. The edge-forming device 14 may for example be slidingly arranged in relation to the base structure in the pressing direction $D_P$. The pressure member may comprise one or more springs 14*c* arranged between the base structure and the edge-forming device 14. The pressure member may alternatively be arranged as a hydraulic or pneumatic pressure device. In alternative non-illustrated embodiments, the edge-forming device 14 may also be configured as a non-movable structure with the protruding element 14*a* arranged on the first mould part 3*a*. The edge-forming device may instead be arranged on the second mould parts 3*b*, or on both the first mould parts 3*a* and the second mould parts 3*b*.

During the movement of the first mould parts 3*a* towards the second mould parts 3*b*, the protruding element 14*a* of each edge-forming device 14 is separating some of the fibres 2*a* of the cellulose blank structure 2 by forces applied to the cellulose blank structure 2 by the protruding element 14*a*. When the first mould parts 3*a* are reaching the second mould parts 3*b*, as shown in FIGS. 5*c-d*, a stopping member 14*d* arranged on each edge-forming device 14 is preventing direct contact between the protruding element 14*a* and the second mould part 3*b* during forming of the compacted edge structure 1*a*, as indicated in FIG. 5*d*. In the embodiment illustrated in FIGS. 5*a-e*, the stopping member 14*d* is arranged as a protrusion on the edge-forming device 14, with an extension in the pressing direction $D_P$ that is greater than the extension of the protruding element 14*a*. When the first mould parts 3*a* are reaching the second mould parts 3*b*, each stopping member 14*d* is meeting the corresponding second mould part 3*b*, as shown in FIGS. 5*c-d*, and through the greater extension in the pressing direction $D_P$, direct contact between the protruding element 14*a* and the second mould part 3*b* is prevented. The cutting pattern 4 in the cellulose blank structure 2 is establishing openings in the cellulose blank structure 2, allowing direct contact between each stopping member 14*d* and corresponding second mould part 3*b*, as understood from FIG. 5*d*. The stopping member 14*d* may be arranged as a continuous element extending around each edge-forming device 14, or alternatively as one or more protrusions extending from each edge-forming device 14. The stopping members 14*d* may instead be arranged on the second mould parts 3*b*, or both on the first mould parts 3*a* and the second mould parts 3*b*.

Each stopping member 14*d* is preventing contact between the protruding element 14*a* and corresponding second mould part 3*b* during forming of the compacted edge structure 1*a*, and with this arrangement, the protruding element 14*a* is arranged at a small distance from the second mould part 4. A small gap is formed between the protruding element 14*a* and the second mould part 3*b*. Upon further movement of the first mould parts 3*a* towards the second mould parts 3*b*, the edge-forming devices 14 are pushed into the first mould parts 3*a* to an edge forming position shown in FIG. 5*d*. When the edge-forming devices 14 are pushed into the first mould parts 3*a*, the edge structures 1*a* of the cellulose products 1 are formed. When forming the edge structures 1*a*, fibres of the cellulose blank structure 2 are gathered in the area between each protruding element 14*a* and corresponding second mould part 3*b*. At the same time, an edge-forming pressure $P_{EF}$ and an edge-forming temperature $T_{EF}$ is applied onto the cellulose blank structure 2. When the edge-forming pressure $P_{EF}$ and the edge-forming temperature $T_{EF}$ are applied to the cellulose blank structure 2, a highly compacted edge structure 1*a* is formed. The edge structure 1*a* is suitably formed as a thin edge extending around the periphery of the cellulose products 1, and the highly compacted formed edge structure 1*a* is efficiently preventing delamination of and moisture absorption into the cellulose products 1. With the high edge-forming pressure $P_{EF}$ applied onto the cellulose blank structure 2 together with the small distance between each edge section 14*b* and corresponding second mould part 3*b*, a very thin compacted cellulose structure is formed that could be used for an easy separation of the cellulose product 1 and the cellulose blank structure 2 outside the forming mould parts. The thin highly compacted cellulose structure is during the edge-forming operation exposed to high compressive stresses, and during the edge-forming process the cellulose fibres fracture due to the stored energy, high tension, and/or tensile stress, in the cellulose structure when the high pressure level is applied onto the cellulose fibres with the edge-forming pressure $P_{EF}$. The residual fibres in the cellulose blank structure 2 remaining after the forming of the cellulose products 1 may be reused. The edge-forming operation is with the edge-forming device 14 taking place with the product-forming operation.

A suitable edge-forming pressure $P_{EF}$ applied onto the cellulose blank structure 2 is at least 10 MPa, preferably in the range of 10-4000 MPa, or more preferably in the range of 100-4000 MPa, when forming the edge-structure 1a. A suitable edge-forming temperature $T_{EF}$ applied onto the cellulose blank structure 2 is in the range of 50-300° C., preferably in the range of 100-300° C., when forming the edge-structure 1a.

A deformation element E for establishing the product forming pressure may be arranged in connection to each first mould part 3a and/or second mould part 3b. In the embodiment illustrated in FIGS. 5a-e, the deformation element E is attached to the first mould part 3a. By using a deformation element E, the forming pressure $P_F$ may be an isostatic forming pressure.

For all embodiments, the first mould parts 3a and/or the second mould parts 3b may comprise the deformation elements E, and the deformation elements E are configured for exerting the forming pressure $P_F$ on the cellulose blank structure 2 in the forming cavities C during forming of the cellulose products 1. The deformation elements E may be attached to the first mould parts 3a and/or the second mould parts 3b with suitable attachment means, such as for example glue or mechanical fastening members. During the forming of the cellulose products 1, the deformation elements E are deformed to exert the forming pressure $P_F$ on the cellulose blank structure 2 in the forming cavities C and through deformation of the deformation elements E, an even pressure distribution is achieved even if the cellulose products 1 are having complex three-dimensional shapes or if the cellulose blank structure 2 is having a varied thickness. To exert a required forming pressure $P_F$ on the cellulose blank structure 2, the deformation elements E are made of a material that can be deformed when a force or pressure is applied, and the deformation elements E are suitably made of an elastic material capable of recovering size and shape after deformation. The deformation elements E may further be made of a material with suitable properties that is withstanding the high forming pressure $P_F$ and forming temperature $T_F$ levels used when forming the cellulose products 1.

Certain elastic or deformable materials have fluid-like properties when being exposed to high pressure levels. If the deformation elements E are made of such a material, an even pressure distribution can be achieved in the forming process, where the pressure exerted on the cellulose blank structure 2 in the forming cavity C from the deformation elements E is equal or essentially equal in all directions between the mould parts. When each deformation element E under pressure is in its fluid-like state, a uniform fluid-like pressure distribution is achieved. The forming pressure $P_F$ is with such a material thus applied to the cellulose blank structure 2 from all directions, and the deformation element E is in this way during the forming of the cellulose products 1 exerting an isostatic forming pressure on the cellulose blank structure 2. Each deformation element E may be made of a suitable structure of elastomeric material or materials, and as an example, the deformation element E may be made of a massive structure or an essentially massive structure of silicone rubber, polyurethane, polychloroprene, or rubber with a hardness in the range 20-90 Shore A. Other materials for the deformation elements E may for example be suitable gel materials, liquid crystal elastomers, and MR fluids.

The forming mould system S further comprises a heating unit. The heating unit is configured for applying the forming temperature $T_F$ onto the cellulose blank structure 2 in each forming cavity C. The heating unit is further suitably configured for applying the edge-forming temperature $T_{EF}$ onto the cellulose blank structure 2 during the edge-forming operation. The heating unit may have any suitable configuration. A suitable heating unit, such as a heated forming mould part or heated forming mould parts may be used for establishing the forming temperature $T_F$ and the edge-forming temperature $T_{EF}$. The heating unit may be integrated in or cast into the first mould parts 3a and/or the second mould parts 3b, and suitable heating devices are e.g. electrical heaters, such as a resistor element, or fluid heaters. Other suitable heat sources may also be used.

Figure 8A:
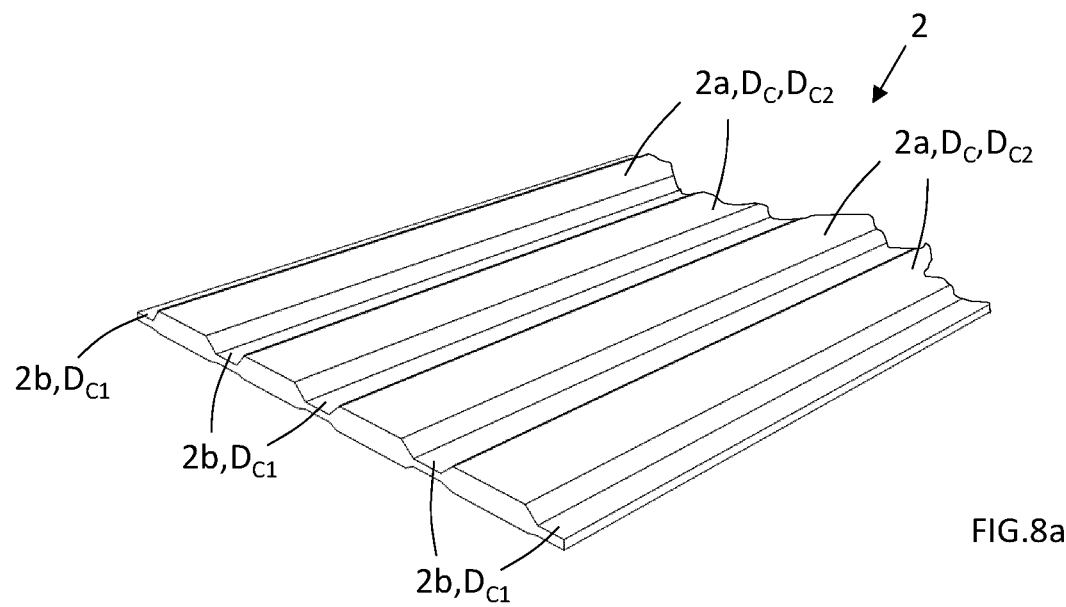
FIG. 8a-c show schematically in perspective views and in a front view, a cellulose blank structure and a forming mould system according to an alternative embodiment of the disclosure.

In FIG. 8a, an alternative embodiment of the cellulose blank structure 2 is schematically illustrated. The cellulose blank structure 2 comprises one or more defined product sections 2a and residual sections 2b, where the residual sections 2b are arranged in connection to the one or more product sections 2a. Before the forming operations in the forming mould system S, the residual section 2b is compressed to a first degree of compression $D_{C1}$ higher than a degree of compression $D_C$ of the one or more product sections 2a, as understood from the figure. The cellulose blank structure 2 further comprises one or more transition sections 2c arranged between the one or more product sections 2a and the residual section 2b. In the transition section 2c, the degree of compression is varying between the first degree of compression $D_{C1}$ and the degree of compression $D_C$ of the one or more product sections 2a. In this embodiment, the one or more product sections 2a may be compressed to a second degree of compression $D_{C2}$, where the first degree of compression $D_{C1}$ is higher than the second degree of compression $D_{C2}$. The respective sections may have densities as described above.

Figure 8C:
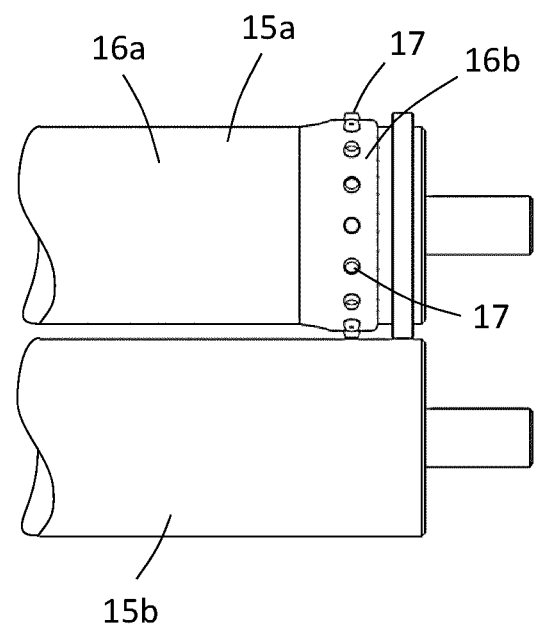
Figure 8B:
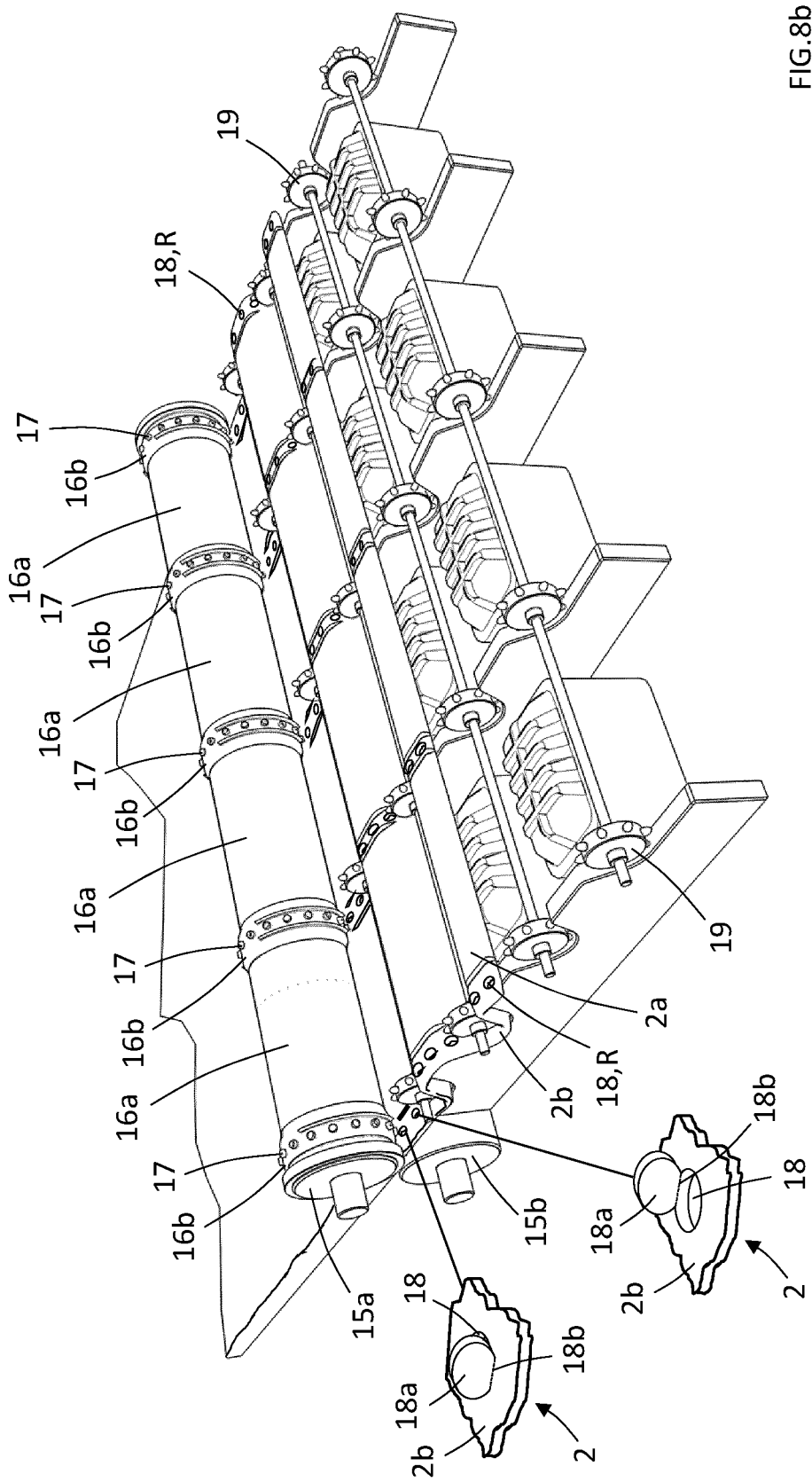

The configurations of the cellulose blank structure 2 in FIGS. 1a, 2a, and 8a may be fed to the forming position $F_{POS}$ with the feeding unit 8 described above. In an alternative embodiment shown in FIGS. 8b-c, the feeding unit 8 instead has a tractor feed configuration for transporting the cellulose blank structure 2 to the feeding position $F_{POS}$. The feeding unit 8 comprises a first roller 15a and a second cooperating roller 15b, and the cellulose blank structure 2 is arranged between the rollers, as shown in FIG. 8b. The first roller 15a and the second roller 15b are compacting the cellulose blank structure 2 for forming the product sections and the residual section 2b. The first roller 15a comprises recessed portions 16a for forming the product sections 2a, in a similar way as described in connection to FIGS. 1b and 2b. Non-recessed portions 16b of the first roller 15a are arranged on each side of the recessed portions 16a for forming the residual sections 2b. In connection to the recessed portions 16a, the first roller 15a comprises a plurality of perforation cutters 17 in the non-recessed portions 16b for forming tractor feed holes 18 arranged in rows R of the cellulose blank structure 2. The tractor feed holes 18 are used for the transportation of the cellulose blank structure 2. In the embodiment illustrated in FIG. 8b, the first roller 15*a* is arranged with five rows of perforation cutters 17 arranged on each side of the respective recessed portions 16*a*. The perforation cutters 17 are in this way forming five rows R of tractor feed holes 18 in the cellulose blank structure 2. The feeding unit 8 further comprises sprocket wheels 19 that are used for feeding the cellulose blank structure 2 to the feeding position $F_{POS}$, where sprockets are engaging the tractor feed holes 18. In FIG. 8*c*, the first roller 15*a* and the second roller 15*b* are illustrated more in detail with the plurality of peroration cutters 17. The perforation cutters 17 are arranged as sharp protrusions that are cutting out the tractor feed holes 18 in the cellulose blank structure 2. The tractor feed holes 18 may be partly cut by the perforation cutters as illustrated in the enlarged portions of the cellulose blank structure 2 in FIG. 8*b* for avoiding loose separated cut-out pieces 18*a* of residual material. The tractor feed holes 18 are engaging the sprocket wheels 19 during the feeding operation. The partly cut tractor feed holes 18 may be arranged with connecting portions 18*b* having hinge-like configurations for holding the cut-out pieces 18*a* of fibre material connected to the cellulose blank structure 2, as shown in FIG. 8*b*. The rotational placement of the connecting portions 18*b* in relation to the partly cut tractor feed holes 18 may be alternated in the cutting pattern to improve registration between the tractor feed holes 18 and the sprocket wheels 19, as illustrated in the enlarged portions of the cellulose blank structure 2 in FIG. 8*b*. In FIG. 8*b*, the connection portions 18*b* of two adjacent tractor feed holes 18 are arranged on opposite sides relative to their respective tractor feed holes 18.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the control unit of the forming mould system S, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/transmitting data with external entities such as e.g. sensors, an off-site server, or a cloud-based server.

The processor or processors of the forming mould system S, may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Cellulose product
1*a*: Edge structure
2: Cellulose blank structure
2*a*: Product section
2*b*: Residual section
2*c*: Transition section
3: Forming mould
3*a*: First mould part
3*b*: Second mould part
4: Cutting pattern
4*a*: Bridging structure
5: First cut
5*a*: First cut line
5*b*: First intermediate section
6: Second cut
6*a*: Second cut line
6*b*: Second intermediate section
7: Additional cut
7*a*: Additional cut line
7*b*: Additional intermediate section
8: Feeding unit
8*a*: Feeder belts
8*b*: Suction channel
9: Cutting unit
10: Rotary die cutter
10*a*: Die cutter
10*b*: Anvil roll
11: Compacting unit
11*a*: First compacting roller
11*b*: Second compacting roller
12: Recess
14: Edge-forming device
14*a*: Protruding element
14*b*: Edge section
14*c*: Spring
14*d*: Stopping member
15*a*: First roller
15*b*: Second roller 16a: Recessed portions
16b: Non-recessed portions
17: Perforation cutters
18: Tractor feed holes
18a: Cut-out pieces
18b: Connecting portions
19: Sprocket wheels
20: Press cutting device
20a: Plate structure
20b: Cutting elements
20c: Pressure cylinders
20d: Anvil structure
C: Forming cavity
$D_{C1}$: First degree of compression
$D_{C2}$: Second degree of compression
$D_F$: Feeding direction
$D_P$: Pressing direction
E: Deformation element
$F_{POS}$: Forming position
$P_{EF}$: Edge-forming pressure
$P_F$: Forming pressure
R: Row
$T_{EF}$: Edge-forming temperature
$T_F$: Forming temperature
S: Forming mould system

The invention claimed is:

1. A method for forming one or more cellulose products in a forming mould system (S) from an air-formed cellulose blank structure, wherein the forming mould system (S) comprises one or more forming moulds, wherein each forming mould comprises a first mould part and a second mould part configured for cooperating with each other during the forming of the one or more cellulose products, wherein the method comprises the steps:
providing the cellulose blank structure, and in the cellulose blank structure defining one or more product sections and a residual section surrounding or arranged in connection to the one or more product sections;
compressing at least a portion of the residual section to a first degree of compression ($D_{C1}$) higher than a degree of compression ($D_C$) of the one or more product sections;
feeding the compressed cellulose blank structure in a feeding direction ($D_F$) to a forming position ($F_{POS}$) in the forming mould system (S), wherein in the forming position ($F_{POS}$) each product section is arranged between a corresponding first mould part and second mould part;
forming the one or more cellulose products from the compressed cellulose blank structure between the first mould part and the second mould part by heating the compressed cellulose blank structure to a forming temperature ($T_F$) in the range of 100-300° C.; and pressing the compressed cellulose blank structure with a forming pressure ($P_F$) in the range of 1-100 MPa.

2. The method according to claim 1,
wherein the compressed cellulose blank structure further comprises one or more transition sections arranged between the one or more product sections and the residual section, wherein in the one or more transition sections the degree of compression is varying between the first degree of compression ($D_{C1}$) and the degree of compression ($D_C$) of the one or more product sections.

3. The method according to claim 2,
wherein the method further comprises the step: arranging a cutting pattern in the residual section and/or the transition section at least partly around each product section; wherein each cutting pattern is forming at least one bridging structure in the residual section and/or the transition section for keeping each product section partly connected with the residual section and/or the transition section.

4. The method according to claim 3,
wherein each cutting pattern comprises a non-continuous first cut arranged around and in connection to a corresponding product section, wherein the non-continuous first cut comprises one or more first cut lines with one or more first intermediate sections between the one or more first cut lines, wherein the one or more first intermediate sections are forming the at least one bridging structure.

5. The method according to claim 4,
wherein each cut is extending through the cellulose blank structure.

6. The method according to claim 4,
wherein at least one of the intermediate sections comprise a cut extending partly through the cellulose blank structure.

7. The method according to claim 3,
wherein each cutting pattern comprises a first cut arranged around and in connection to a corresponding product section, wherein the first cut comprises a first cut line with a first intermediate section forming the at least one bridging structure.

8. The method according to claim 3,
wherein each cutting pattern comprises a non-continuous first cut arranged around and in connection to a corresponding product section, and a non-continuous second cut arranged around and outwards of the non-continuous first cut relative to the product section.

9. The method according to claim 8,
wherein the non-continuous first cut comprises one or more first cut lines with one or more first intermediate sections between the one or more first cut lines, wherein the non-continuous second cut comprises one or more second cut lines with one or more second intermediate sections between the one or more second cut lines, wherein the one or more first intermediate sections and the one or more second intermediate sections are forming the at least one bridging structure.

10. The method according to claim 9,
wherein the non-continuous first cut and the non-continuous second cut are arranged in an overlapping relationship relative to each other, wherein the one or more first cut lines are overlapping the one or more second intermediate sections, and wherein the one or more second cut lines are overlapping the one or more first intermediate sections.

11. The method according to claim 8,
wherein each cutting pattern further comprises at least one non-continuous additional cut arranged around and outwards of the non-continuous second cut relative to the product section, wherein each of the at least one non-continuous additional cut comprises one or more additional cut lines with one or more additional intermediate sections between the one or more additional cut lines.

12. The method according to claim 3,
wherein the method further comprises the step: arranging the one or more cutting patterns in the residual section and/or the transition section around each product section with a cutting unit.

13. The method according to claim 12,
wherein the cutting unit is arranged as a rotary die cutter, wherein the method further comprises the step:
forming the one or more cutting patterns, and compressing at least a part of the residual section with the rotary die cutter in a single operational step; or forming the one or more cutting patterns, compressing at least a part of the residual section, and compressing at least a portion of the one or more product sections with the rotary die cutter in a single operational step.

14. The method according to claim 1,
wherein the method further comprises the step: compressing at least a portion of the one or more product sections to a second degree of compression ($D_{C2}$) prior to the feeding of the compressed cellulose blank structure to the forming position ($F_{POS}$), wherein the first degree of compression ($D_{C1}$) is higher than the second degree of compression ($D_{C2}$).

15. The method according to claim 1,
wherein the method further comprises the step: in the forming position ($F_{POS}$) at least partly displacing the residual section and the one or more product sections relative to each other in a pressing direction ($D_P$) of the forming mould system (S) prior to the forming of the one or more cellulose products.

16. The method according to claim 1,
wherein the method further comprises the step: cutting out the one or more cellulose products from the cellulose blank structure in the forming mould system (S) during forming of the one or more cellulose products (S).

17. The method according to claim 1,
wherein the one or more product sections are arranged in the cellulose blank structure in a pattern corresponding to the arrangement of the one or more forming moulds in the forming mould system (S).

18. The method of claim 1 wherein the forming pressure ($P_F$) is in the range of 4-20 MPa.

19. A forming mould system (S) for forming one or more cellulose products from an air-formed cellulose blank structure comprising one or more defined product sections and a defined residual section surrounding or arranged in connection to the one or more product sections, wherein the forming mould system (S) comprises one or more forming moulds, wherein each forming mould comprises a first mould part and a second mould part configured for cooperating with each other during the forming of the cellulose products,
wherein the forming mould system (S) further comprises:
a compacting unit configured for compressing at least a portion of the residual section to a first degree of compression ($D_{C1}$) higher than a degree of compression ($D_C$) of the one or more product sections; and a feeding unit configured for feeding the compressed cellulose blank structure in a feeding direction ($D_F$) to a forming position ($F_{POS}$) in the forming mould system (S), wherein in the forming position ($F_{POS}$) each product section is arranged between a corresponding first mould part and second mould part;
wherein the one or more forming moulds are configured for: forming the one or more cellulose products from the cellulose blank structure between the first mould part and the second mould part by heating the cellulose blank structure to a forming temperature ($T_F$) in the range of 100-300° C.; and pressing the cellulose blank structure with a forming pressure ($P_F$) in the range of 1-100 MPa.

20. A cellulose blank structure for forming one or more cellulose products in a forming mould system (S), wherein the cellulose blank structure is air-formed and comprises one or more defined product sections and a defined residual section surrounding or arranged in connection to the one or more product sections, wherein at least a portion of the residual section has a first degree of compression ($D_{C1}$) higher than a degree of compression ($D_C$) of the one or more product sections, wherein the cellulose blank structure further comprises:
one or more transition sections arranged between the one or more product sections and the residual section, wherein in the transition section the degree of compression is varying between the first degree of compression ($D_{C1}$) and the degree of compression ($D_C$) of the one or more product sections; and
a cutting pattern in the residual section and/or the transition section at least partly around each product section; wherein each cutting pattern is forming at least one bridging structure in the residual section and/or the transition section.

* * * * *